United States Patent
Granville et al.

[11] Patent Number: 5,590,060
[45] Date of Patent: Dec. 31, 1996

[54] APPARATUS AND METHOD FOR AN OBJECT MEASUREMENT SYSTEM

[75] Inventors: Gregg Granville, New Boston; J. Peter Glasson, Durham, both of N.H.

[73] Assignee: Metronics, Inc., Bedford, N.H.

[21] Appl. No.: 558,767

[22] Filed: Nov. 15, 1995

Related U.S. Application Data

[63] Continuation of Ser. No. 258,123, Jun. 10, 1994, abandoned, which is a continuation of Ser. No. 854,247, Mar. 20, 1992, abandoned.

[51] Int. Cl.$^6$ ............................................................. G06K 9/00
[52] U.S. Cl. ............................. 364/560; 364/552; 395/51; 356/394
[58] Field of Search ........................................ 356/445, 446, 356/378, 394, 384, 371, 429, 430, 138; 382/106, 181, 190, 209; 395/50, 51, 919; 33/503–505, 545, 546; 364/167.01, 468, 188, 474.24–474.28, 474.29, 514 R, 552, 560; 318/570

[56] References Cited

U.S. PATENT DOCUMENTS

| | | | |
|---|---|---|---|
| 4,030,837 | 6/1977 | Kojima et al. | 356/445 |
| 4,628,531 | 12/1986 | Okamoto et al. | 356/394 |
| 4,656,358 | 4/1987 | Divens et al. | 356/386 |
| 4,693,608 | 9/1987 | Kitagawa et al. | 356/378 |
| 4,835,704 | 5/1989 | Eichelberger et al. | 264/490 |
| 4,945,501 | 7/1990 | Bell et al. | 364/571.05 |
| 4,977,361 | 12/1990 | Phillips et al. | 356/394 |
| 5,131,755 | 7/1992 | Chadwick et al. | 356/394 |
| 5,134,575 | 7/1992 | Takagi et al. | 356/394 |
| 5,334,918 | 8/1994 | McMurtry et al. | 364/560 |
| 5,355,306 | 10/1994 | Waldo, III | 364/167.01 |

OTHER PUBLICATIONS

Kwok et al., Reverse Engineering: Extracting CAD Data from Existing Parts, Mar. 1991, pp. 52–56, Mechanical Engineering–CIME v113, n3.

*Primary Examiner*—Ellis B. Ramirez
*Assistant Examiner*—Craig Steven Miller
*Attorney, Agent, or Firm*—Iandiorio & Teska

[57] ABSTRACT

An apparatus and method for an object measurement system is described which may be utilized in the inspection and measurement of various objects so as to obtain information regarding their features, dimensional measurements and tolerances. Various devices and methods for data point location and data entry are described which may be utilized in either manual and/or automatic modes of system operation. Input data is monitored so as to prevent erroneous data from being utilized and indication means are provided to notify a user or operator when erroneous data has been entered into the system. The present invention also provides a means by which the user or operator may enter point location data without having to preselect a feature type which is to be inspected and/or measured. The present invention also provides an apparatus and method for processing the point location data so as to determine the feature type therefrom within pre-specified error limits and without user pre-selection and for resolving ambiguities which may arise in the course of such processing. The user or operator may also override system operation if the feature type does not match the user's or operator's expected result. The system provides extensive user interaction capabilities and methods.

30 Claims, 10 Drawing Sheets and OBJECT MEASUREMENT SYSTEM

This is a continuation of application Ser. No. 08/258,123, filed Jun. 10, 1994 now abandoned, which is a continuation application of application Ser. No. 07/854,247, filed Mar. 20, 1992 now abandoned.

FIELD OF THE INVENTION

The present invention relates to an apparatus and method for an object measurement system which is utilized to perform the inspection and measurement of objects in order to determine and evaluate among other things their shapes, features, dimensional measurements and information relating to their tolerances.

BACKGROUND OF THE INVENTION

Object measurement systems known in the prior art utilize a system arrangement which includes a central processing means or a host computer which processes raw data representative of point locations measured from an object, and calculates various information pertaining to the object. In these object measuring systems, known from the prior art, the user or operator is required to interact with the object measurement system in at least two ways. In a first instance, the user or operator must pre-select a function type, of the object or part thereof, being inspected prior to entry of point data. This presents problems and disadvantages as it results in a loss of time during the inspection and measurement routine as well as being a hinderance especially when the type of feature is not known to the user or operator beforehand.

In a second instance, the user or operator must direct the object measurement system to those points where point data is desired to be taken. This process may be performed either manually by having the user or operator actually targeting these point locations or automatically by having the user or operator directing the system to target these point locations by utilization of an automatic point sensor.

After a chosen feature has been generated, the user or operator could then choose to compare the results with the known features and measurements of the objects. Tolerance measurements could also be performed for the features. Examples of the utilization of tolerance measurements include checking a hole in the object for size or positional location, determining the straightness of a line, or comparing two holes to determine their concentricity.

Prior art object measurement systems have also found application in the field of reverse engineering. In such applications, the dimensions of the object are unknown. The user or operator would utilize the measurement system to inspect and measure the object and then provide this data to a user or operator whereupon a drawing of the object may be generated which might include information regarding features, dimensional measurements and tolerances.

Two primary limitations exist in the prior art object measurement systems described above. Once such limitation lies in the fact that these systems do not have the ability to detect errors in the point location input data. If these errors are not detected by the system, the measurement obtained thereby may be inaccurate. In some instances, these errors may be relatively small and, hence, not readily apparent to the user or operator.

A second limitation inherent in the measurement systems of the prior art lies in the fact that they require interaction by the user or operator. The user or operator has to select a feature type prior to performing a measurement, and then has to either manually target data point locations or direct the system to target points with an automatic point sensor. The need for user interaction results in an inefficient measurement system as the user or operator is constantly required to perform different exercises during the measurement process. The above described limitations of the prior art object measurement systems, result in a system which requires greater manpower effort and greater equipment operating time and costs.

SUMMARY OF THE PRESENT INVENTION

The present invention provides an apparatus and method for an object measurement system which addresses the limitations found in the object measurement systems of the prior art, and further, provides for additional improvements over the prior art systems which will be readily apparent to those skilled in the art.

The subject of the present invention deals with an apparatus and method for an object measurement system which may be utilized in the inspection and measurement of various objects so as to obtain information regarding their features, dimensional measurements and tolerances.

The apparatus of the present invention comprises a controller or central processing unit with attendant memory storage devices and an interactive user interface device which allows interaction between the user or operator of the system. The object measurement system also comprises a user pointing device for effectuating user or operator interaction with the system, and an audio feedback device which can be utilized in conjunction with the interactive user interface device. The audio feedback device will provide audio signals to the user or operator indicative of system operation. The apparatus also provides an inspection device which is utilized to perform object inspection and measurement thereon and a probing means for the selection of point locations from which point location data can be obtained for use in system operation. Various data probing and data entry devices and methods may be utilized in the present invention. Further, the probing methods and means which are employed may be manually or automatically activated and controlled.

The apparatus of the present invention also comprises a means by which the user or operator may view the object being inspected and/or measured. Such viewing means may also provide for the magnification of the object under study.

The present invention further provides an apparatus and method for automatically determining the nature of a variety of digital and analog signals which are generated by a point location data generating device. This data may be continuously monitored during system operation to ensure that it is not erroneous. If erroneous data is detected, the system will notify the user or operator.

The present invention also provides an apparatus and method for adjusting the manner in which the object measurement system discriminates between the kinds or types of features to be inspected or measured whether these feature types be a point, a distance, a line, a circle, an arc, or an angle. The apparatus and method of the present invention will generate the feature type and its dimensional measurements and characteristics from point location data obtained during the measurement routine. The object measurement system is also capable of resolving ambiguities which may arise when multiple feature types are possible.

During system processing, the apparatus and method of the present invention detects questionable or erroneous data results and notifies the user or operator of these results. Further, the user or operator may set-up or define the error limits and criteria which is to be utilized by the object measurement system. Further, upon viewing the type of feature generated by the system upon completion of its processing operation, the user or operator may select to disregard the feature type generated by the system and instead choose to generate another feature type which will be generated by the system from the previously stored data.

Accordingly, it is an object of the present invention to provide an object measurement system which provides a more precise determination of the feature types, dimensional measurements, and information relating to tolerances for an object to be inspected and/or measured while requiring less user or operator interaction while, at the same time, providing for an object measurement system which is more efficient and cost effective than the systems of the prior art.

It is another object of the present invention to provide an apparatus and method for continuously monitoring the input data entered into an object measurement system so as to guard against the entry and processing of erroneous data while also providing a means by which to notify a user or operator of such an erroneous data condition.

It is another object of the present invention to perform data processing while continuously monitoring the data utilized therein so as to ensure that said data is within pre-defined error limits which either may be pre-selected by the user or operator or which may be updated during system operation.

It is yet another object of the present invention to provide an apparatus and method for an object measurement system which may utilize various data probing and data entry devices and methods which may be controlled either manually or automatically.

It is yet another object of the present invention to provide an object measurement system in which the user or operator has the ability to disregard or override the results generated by the system if said results are inconsistent with expected results.

It is still another object of the present invention to provide an object measurement system, the operation of which, may be activated and reactivated either manually or automatically.

Other objects and advantages of the present invention will be made apparent to those persons skilled in the art after a review of the Description of the Preferred Embodiment taken in conjunction with the Drawings which follow.

DETAILED DESCRIPTION OF THE PREFERRED EMBODIMENT

Figure 1:
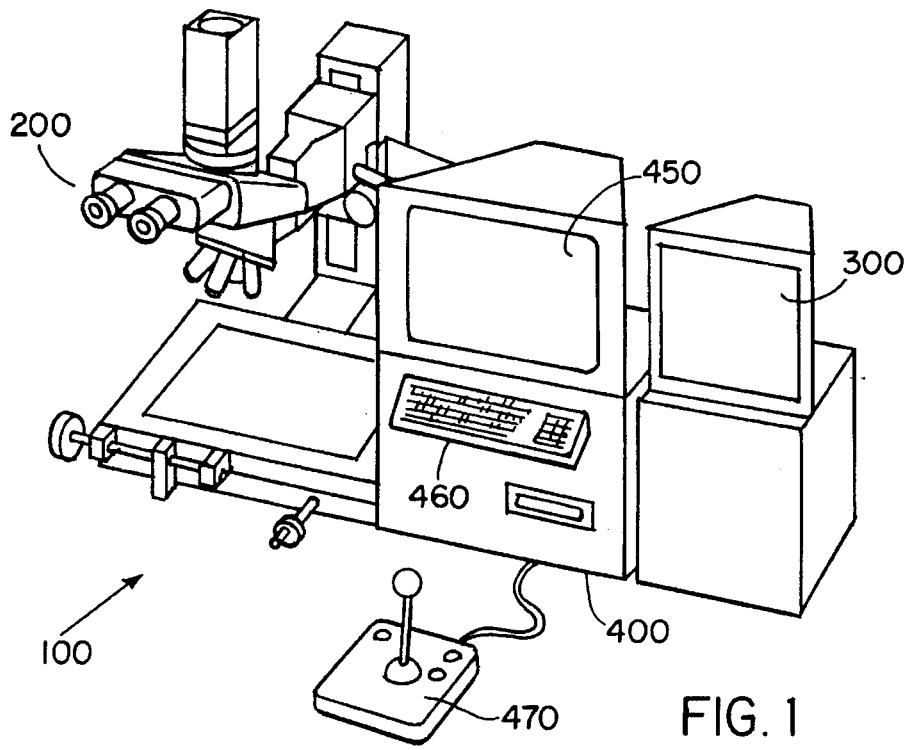
FIG. 1 illustrates a typical object measurement system which is the subject of the present invention.

FIG. 1 illustrates a typical object measuring system, wherein the apparatus and method of the present invention may be utilized, for inspecting and/or measuring objects and which is denoted generally by the reference numeral 100. As illustrated in FIG. 1 the embodiment of the object measuring system 100 comprises an inspection station 200, an inspection display monitor 300, an interactive user interface system 400 which contains a display monitor 450, a keyboard 460 and a user pointing device 470.

Figure 2:
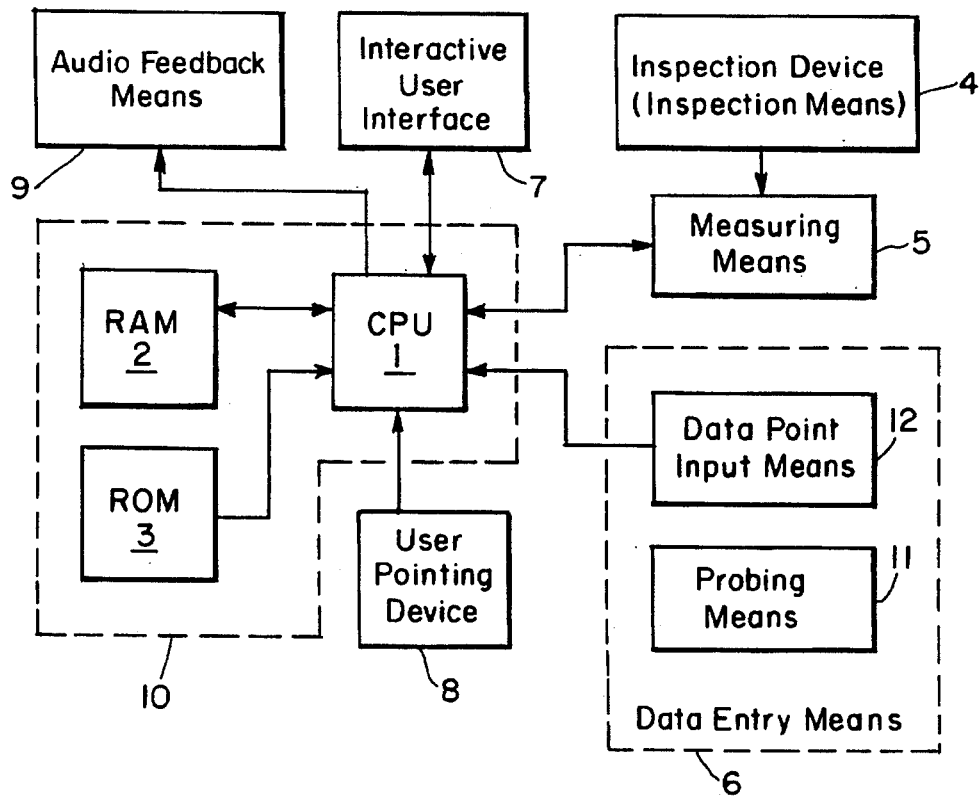
FIG. 2 illustrates, in block diagram form, a first embodiment of the present invention wherein data representing measurement point locations are entered in a manual data entry or cross hair mode.

FIG. 2 illustrates, in block diagram form, the apparatus of the present invention. As illustrated in FIG. 2, the present invention comprises a controller 10 which further comprises a central processing unit (hereinafter "CPU") 1, a random access memory (hereinafter "RAM") 2 and a read only memory (hereinafter "ROM") 3. The present invention also comprises an inspection means 4, a measuring means 5 and a data entry means 6 which will include a probing means 11 as will be described below. The present invention also comprises an interactive user interface 7, a user pointing device 8 and an audio feedback means 9.

The controller 10 in the preferred embodiment comprises a CPU 1, a RAM device 2 and a ROM device 3. The controller 10 may be realized by any one of a number of microprocessors, such as the Motorola Model 68000 or the Intel Model 80386, utilized in conjunction with their corresponding RAM and ROM memory devices.

The controller 10 may also be realized by a wide variety of micro-computer systems, mini-computer systems, personal computers, macro-computers systems or main frames. In essence, any device which can provide control over an electronic system while allowing user interaction or interfacing can be utilized as the system controller for the present invention. While the controller 10 is shown as incorporating memory devices for RAM 2 and ROM 3, such controller may simply by comprised of a CPU 1 in which case the RAM and ROM would be external or peripheral to the CPU 1. Further, it is possible to utilize an imbedded controller which incorporates the CPU 1, the RAM 2 and ROM 3 on a single chip. Many varieties of controllers including CPU's and memory devices are possible in the embodiment of the present invention. Further, it will be noted at this juncture that any and all of the hardware components or chips utilized in the system could be combined integrally with the CPU 1 or the controller 10 so as to provide the present system in or on a single apparatus or device.

The Random Access Memory (RAM) 2 and the Read Only Memory (ROM) 3 are connected to the CPU 1 and are used in their conventional senses. In this manner, data utilized in system processing routines are stored in the RAM 2 while data which is utilized for system operation and control (i.e. system algorithms or program code) is stored in the ROM 3. The RAM 2 and the ROM 3, as noted above, may be chosen from a wide variety of available RAM and ROM memory structures as long as their selection is compatible with the CPU employed. The ROM could be a ROM memory device, a hard disk, or any memory storage media which facilitates the storage of program code or data which can be repeatably read therefrom during system operation.

The interactive user interface 7 is connected to the CPU 1 of the controller 10. The interactive user interface 7 allows the user or operator to obtain information from the object measuring system or the controller 10 while also allowing the user to control the operation of the system by selecting commands and/or by inputting operating data. The interactive user interface 7 comprises the user interface system 400 which is illustrated in FIG. 1. The interactive user interface further comprises a display monitor 450 which provides a readout of the data results as well as a video display of the feature type of the object, or part thereof, being inspected. The interactive user interface also comprises a user interactive keyboard 460, which may be optional, and which may allow the user or operator to enter commands or data into the object measuring system. The interactive user interface 7 may also have actuating devices or mechanisms (not shown) associated therewith which may also provide the user or operator with a means by which to select commands and/or input data into the system. This arrangement provides a user-friendly environment in which to operate the object measurement system of the present invention. The interactive user interface 7 may also employ an organizational software program in order to provide enhanced system/operator interfacing.

The present invention also utilizes a user pointing device 8 which is connected to the CPU 1 of controller 10. The user pointing device 8 may comprise the user pointing device 470 illustrated in FIG. 1 which may be a joystick, a mouse, a trackball or any device which can provide a means by which a user or operator can enter input commands and/or data into the system during operation. Use of this pointing device 8 also enhances interfacing between the user or operator in that the user need only point to a menu item on the display monitor 450 and activate the pointing device 8. In this manner, the user pointing device 8 may function as an alternative to the keyboard 460 or other actuating mechanisms utilized in conjunction with the interactive user interface 7. It should be noted that virtually any type of user pointing device 8 may be employed with the interactive user interface 7 in the present invention.

An audio feedback means 9 is also employed in the embodiment of the present invention. The audio feedback means 9 is connected to the CPU 1 of the controller 10 and provides a means by which the present invention can provide an audio signal informing the user or operator of the occurrence of an event or a status condition during system operation. The audio feedback means 9 can be employed to notify the user operator that the system is malfunctioning as well as when the system is operating properly. The audio feedback means 9 may also be utilized to inform the user or operator that data which has been input is correct or that it is erroneous. The audio feedback means 9 may also provide audio indication of other events which will be described below. The audio feedback means 9 may be any type of beeper, horn, buzzer, speaker, or sounding device which has the capability of outputting sounds, tones or melodies. In a preferred embodiment, the capability to output multiple sounds, tones or melodies is preferred in order to provide sounds indicative of one or more events or occurrences. For example, a pleasant sound, tone, or melody may be used to indicate that valid data has been entered or that the system is operating properly while an unpleasant sound, tone or melody may be used to indicate that erroneous data has been entered or that the system is malfunctioning. The present invention also comprises an inspection device 4 which may include the inspection station 200 and an inspection display monitor 300 which are illustrated in FIG. 1.

Referring once again to FIG. 2, the inspection device 4 is connected to a measuring means 5, the structure and operation of which, will be described in more detail below. The inspection device 4 may be any device upon which an object may be inspected, measured or viewed.

Figure 3:
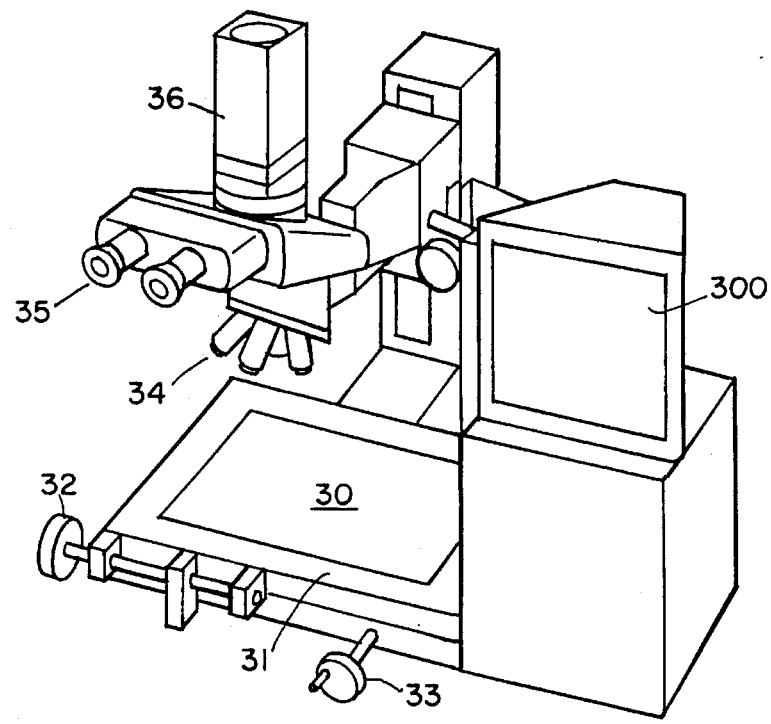
FIG. 3 illustrates a typical inspection device which can be utilized in the object measurement system of the present invention.

FIG. 3 illustrates an inspection device 4 having an embodiment which is preferred in the present invention. The inspection device 4 comprises a stage 30 upon which the object to be viewed rests. The stage 30 may contain a holding means (not shown) which may allow the object to be supported and/or held in a specified orientation for viewing. The holding means may be a vise or a clamp or other suitable device. The stage 30 is movably situated upon a support tray 31 and is moveable about the length and width of the support tray 31. Movement of the stage 30 about the support tray 31 is accomplished by stage movement means 32 and 33 wherein stage movement means 32 and 33, respectively, control the movement of the stage 30 about the length and width, respectively or vice versa, of the support tray 31.

Movement means 32 and 33 may be a rotating screw-like arrangement for effecting stage translation or it may be a track-ball or other means for effecting movement of the stage 30 along the support tray 31. The stage 30 also incorporates linear encoders (not shown) which provide data representative of the location of the stage 30 relative to a fixed viewing device during the object viewing process. In this manner, the translational movement of the stage 30 about the length and width of the support tray 31 are monitored by the linear encoders which are situated about the X and Y axes of the stage 30. One linear encoder provides locational information pertaining to the X axis displacement of the stage 30 while another linear encoder provides locational information pertaining to the Y axis displacement of the stage 30.

While the linear encoders employed in the present invention may be of any linear encoder type, such as a glass scale encoder or a rotary encoder, etc., a glass scale encoder is utilized in the preferred embodiment of the present invention. While the operation of the linear encoders are well known to those skilled in the art, and therefore are not made a part of this application, it is sufficient to note that the glass encoders employed have lines or graduations deposited thereon which represent distance or location. The location of the stage 30 in the X and Y coordinate system along the support tray 31 is determined by a detecting means such as a light bulb which monitors the movement across the lines or graduations on the linear encoders and generates electronic signals in the form of quadrature pulses as an output signal. This output signal is thereupon sent to the measuring means 5 which provides this data to the CPU 1 of controller 10, which is indicative of both the X and Y axis coordinate data representative of the location of the stage 30.

While the present invention utilizes linear encoders as a means by which the location of the stage 30 is monitored and represented, it should be noted that alternative location determination and input data generation means are also envisioned. Further, while quadrature signals are digital in nature, analog signals may also be generated depending upon the location determination means employed.

The inspection device 4 also includes a viewing device 34 which has a fixed location above the support tray 31. The viewing device 34 may be a microscope or a lens system which provides the user or operator with a means by which to view the object being inspected. In the present invention, the viewing device 34 is a microscope which has a wide range of magnification fields with such fields being dictated by the particular object to be inspected and the requirements of system operation. The viewing device or microscope 34 also may have an eyepiece section 35 which may allow the user or operator to view the object more conveniently. Further, the present invention employs a video camera 36 which provides a video display of the object being inspected with said magnified video image being displayed to the user or operator on an inspection display monitor 300. This arrangement provides the user or operator with a view of the object at all times. The embodiment of FIG. 3 allows the user or operator to view the object either through the microscope 34 via eyepiece section 35 or via the inspection display monitor 300.

While the preferred embodiment of the inspection device 4 has been described wherein the viewing device 34 is stationary and the stage 30 is moveable, it is also possible to provide an inspection device wherein the stage 30 is stationary while the viewing device 34 is moveable. In such an embodiment, viewing device translation means, analogous to elements 32 and 34 of FIG. 3, must be provided for controlling the movement or translation of the viewing device 34. Further, linear encoders must then be employed in conjunction with the viewing device 34 or in some other fashion so as to monitor and provide data representative of the location of the viewing device 34 relative to the stage 30.

Further, while the inspection device 4 has been described as employing a microscope and a video camera, it is also possible to use other inspection devices which may include optical comparators, coordinate measuring machines and measurement gages. The inspection device 4, as described above, can also be utilized in conjunction with various probing means such as a cross hair probe, an auto edge detector probe or a video edge detector probe as well be described in greater detail hereinafter.

Referring once again to FIG. 2, the present invention also utilizes a measuring means 5 which is connected to the inspection device 4 and which is further connected to the CPU 1 of the controller 10. The measuring means 5, in the embodiment of FIG. 2, receives data which is indicative of the location of the stage 30, relative to the stationary viewing device 34, and therefore, the point location on or about the object which is chosen for measurement. This data, which is generated by the linear encoders, is serial in nature and includes both the X and Y axis coordinate data. This data is then passed on to the CPU 1 of controller 10 at the time that a data entry means 6 has been activated as will be described in more detail below. As will also be described in greater detail below, the measure means 5 has, via the linear encoders of the inspection device 4, continuously updated information regarding the location of the stage 30 and, therefore a point location on or about the object being inspected, relative to the stationary viewing device 34. This data will be transferred to the CPU 1 of controller 10 upon the activation of the data entry means 6. It should be noted at this juncture that it is also possible to utilize a measure means 5 which could be designed as part of and therefore built into the CPU 1 of the controller 10. The embodiment of the measure means 5 will be described in more detail below in conjunction with FIGS. 6 and 7.

The present invention, as illustrated in FIG. 2, also comprises a data entry means 6, which is connected to the CPU 1 of controller 10. The data entry input means 6 also comprises a probing means which is a means by which to allow the user or operator to locate a point on or about the object which is being inspected which point will be a chosen point location at which a data measurement will be taken. In the embodiment of FIG. 2, the probing means 11 is a cross hair which is located stationary within, and at the center of the viewing device 34, and above the object being inspected. In this manner, while the cross hair of the probing means remains stationary with respect to the viewing device 34 of FIG. 3, the stage 30 of the inspection device is moved about the support tray 31 until a desired location on or about the object being inspected, is located by the cross hair. This point location may be on the object, on an internal or external periphery of the object, or at some other point or extremity on or about the object. Once a desired measurement location point has been located by the cross hair of the probing means 11, a data point input means 12, which may be a foot switch, a keyboard device, a mouse, a click stick or any other type of actuation device can be activated by the user or operator which will thereby enter the X and Y axis coordinate data, representative of the measurement point location, into the CPU 1 of the controller 10.

The data entry means 6 therefore provides a means by which to determine the point location at which a measurement is to be made and provides a mechanism by which to enter this data into the CPU 1 of controller 10. While the controller 10, the interactive user interface 7, the user pointing device 8 and the audio feedback means 9 may be standard equipment in the embodiment of the present invention, alternate embodiments are contemplated for the utilization of the data entry means 6, the measuring means 5 and the inspection device 4. While the measuring means 5 and the inspection device 4 may be of a standard design, the utilization of alternative data entry means 6 along with the associated changes in the interaction of said data entry means 6 with the measuring means 5, the inspection device 4 and in some cases, the CPU 1 of the controller 10, provide for alternative means for point location probing and data entry in the present invention.

Figure 4:
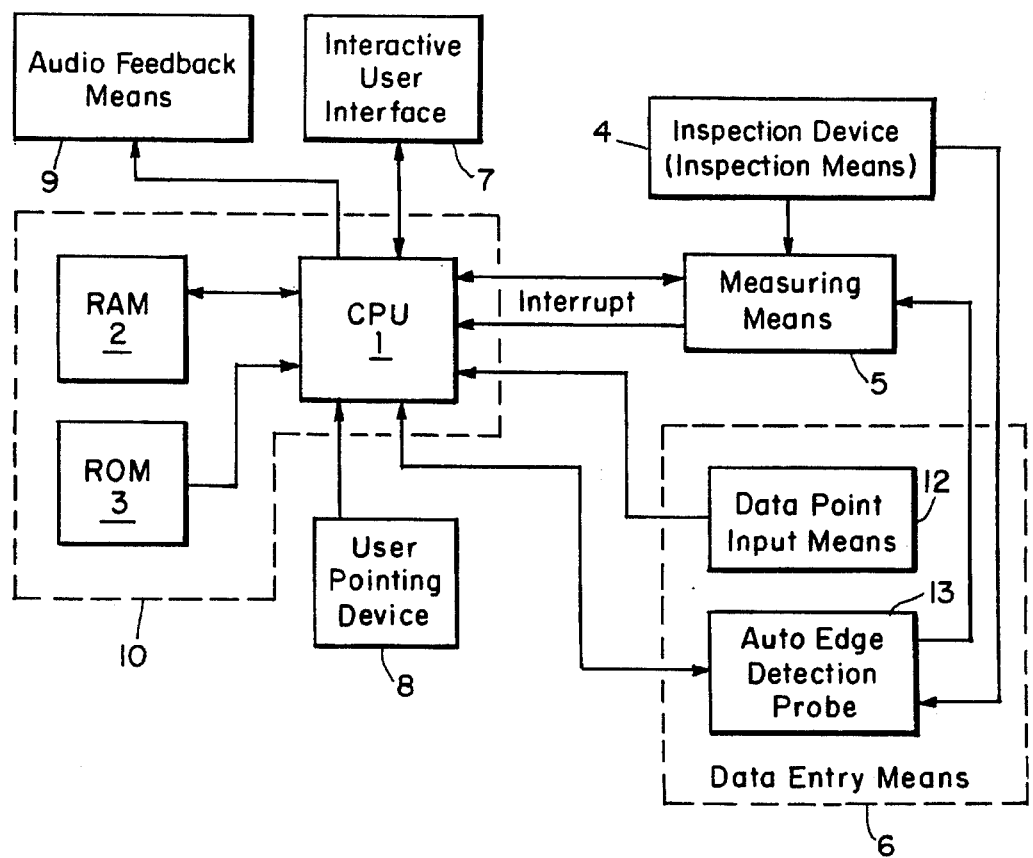
FIG. 4 illustrates, in block diagram form, a second embodiment of the present invention wherein data representing measurement point locations are entered in an auto edge detection mode.
Figure 5:
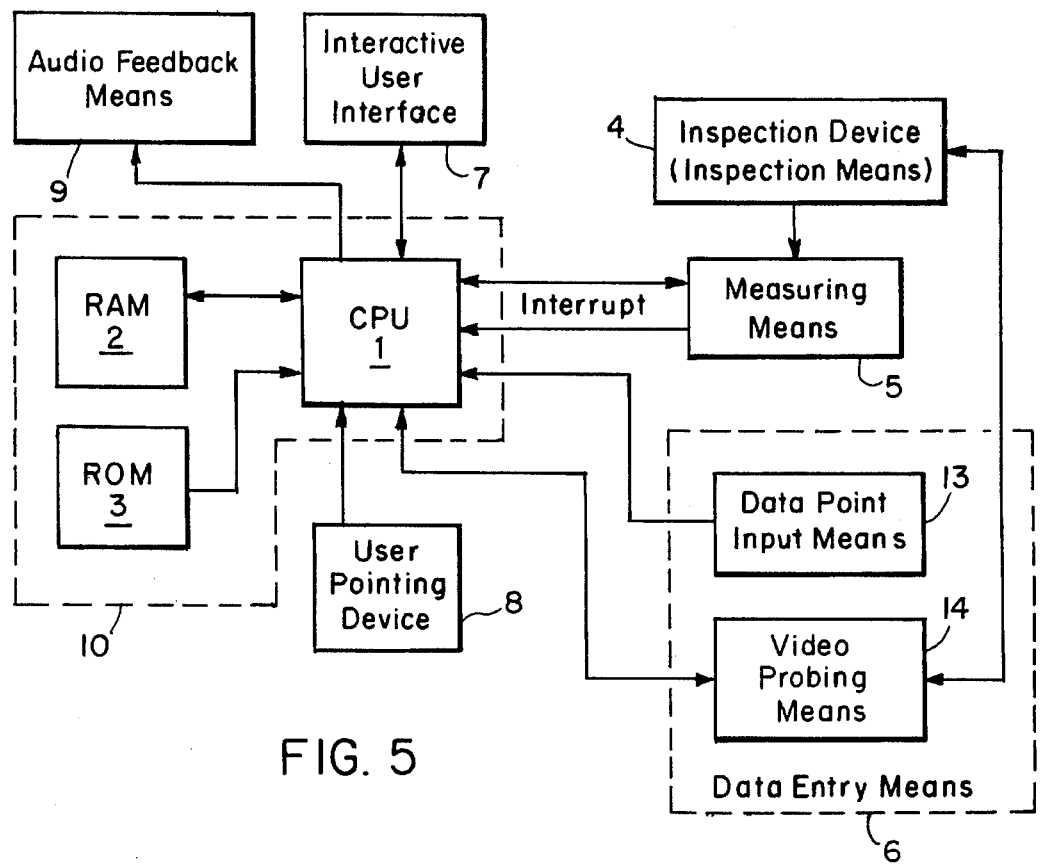
FIG. 5 illustrates, in block diagram form, a third embodiment of the present invention wherein data representing measurement point locations are entered in a video edge detection mode.

Three distinct embodiments are envisioned as preferred embodiments for the apparatus of the present invention. These three embodiments are a manual data entry mode also described as a cross hair mode, which has been described in FIG. 2 and which will be described in more detail below, an auto edge detection mode, the embodiment of which is illustrated in FIG. 4, and a video edge detection mode the embodiment of which is illustrated in FIG. 5. All three of the preferred embodiments provide the advantages associated with the apparatus and method of the present invention. However, each of the three embodiments provide alternative means by which to locate and enter point location data for measurement points on the object being inspected and/or measured.

As noted above, the embodiment of FIG. 2 (embodiment #1), employs a manual data entry or cross hair mode for point location and data entry. Point location data is obtained and entered into the CPU 1 of controller 10 in the following manner. In the manual data entry or cross hair mode, the present invention utilizes a cross hair which is located in the center of the viewing field of the viewing device 34 (in FIG. 3) and above the stage 30 upon which the object rests. Since the object to be inspected is rested on the moveable stage 30, the linear encoder system employed could be calibrated to measure movement of the stage 30 or a point on the stage 30 which point may correspond to the location of the cross hair. The stage 30 may be translated along the length and width of the support tray 31 until the cross hair locates a desired point location.

Since the linear encoders supply point locational data to the measuring means 5 continuously, the user or operator need only activate a data point input means 12 which in effect alerts the CPU 1 of controller 10 that an event, the location of a data point or point location, on or about the object being inspected, has been made. The point location data from the linear encoders of the inspection device 4, which is already present in the measure means 5, is then transmitted to the CPU 1 of controller 10. This may occur by means of a system interrupt during the operation of CPU 1 and providing system software so that, upon said interrupt, the CPU 1 will read the data present in the measuring means 5. It should be noted that the data transmitted by the linear encoders and by the measure means 5 is serial in nature and represents location data for the X and Y axis coordinates of the point location. The CPU 1 of the controller 10 will process this data so as to obtain the actual X coordinate and Y coordinate component values which represent point location and store these values for future processing as will be described below. As discussed above, the measure means 5, at all times has point location data from the linear encoders available therein. The interrupt may be generated by means such as actuating an actuation mechanism on the data point input means 12 which may be a footswitch or other suitable device. Upon the interrupt, the CPU 1 will read the point location data from the measure means 5. In effect the data point input means 12 tells the CPU 1 that it has located a data point and the CPU 1 of controller 10 will read the point location data from the measuring means 5.

FIG. 4 illustrates a second embodiment of the present invention (Embodiment #2) wherein point location data is obtained and input to the CPU 1 of the controller 10 by employment of an auto edge detection mode. Referring to FIG. 4, it can be noted that the auto edge detection mode utilizes essentially the same data entry device 6 as the manual data entry or cross hair mode of FIG. 2, however, the data entry means 6 in the auto edge detection mode of FIG. 4 comprises an edge detector probe 13 which is connected to the inspection device 4 and to the measuring means 5. The edge detector probe 13 is employed to automatically enter point location data into the system. Further, the measuring means 5 supplies an interrupt line to the CPU 1 of the controller 10. The data point input means 12 also is connected to the CPU 1 of controller 10 so as to provide a means for manual data entry. At this juncture, it is important to note that data may be manually entered by the data point input means 12 despite the fact that an automatic point location device or mode is utilized or employed in an embodiment.

The CPU 1 is connected to the auto edge detection probe 13 in FIG. 4 so as to allow communication between the CPU 1 and the auto edge detection probe 13 for the purpose of providing initialization and calibration signals between the two. The edge detection probe 13 of FIG. 4 may be an optical edge detection probe such as a white light detector or it may be any suitable alternative device. The auto edge detection probe 13 is fixed in a stationary manner in the viewing device 34 and at a location preferably in the center of the field of view of the viewing device 34. During a typical measuring routine, the stage 30 carrying the object to be inspected is translated beneath the viewing device 34 so that the auto edge detection probe 13 is essentially probed about the object.

When the auto edge detection probe 13 detects an edge, defined as the crossing from a light object to a dark object, or vice versa, in the display field, a point location on the object will automatically be detected. Edge detection is performed, in a manner known in the art, in that when the auto edge detection probe 13 crosses from a light object to a dark object, or vice versa, an event occurs in the detection probe 13 which signifies that an edge of the object has been crossed. The exact point of crossing is known from the linear encoders which are utilized in conjunction with the stage 30 so that the exact location of this point location is known. As in embodiment #1, this point location data is always present in the measure means 5.

During operation, the inspection device 4 sends a synchronizing signal to the auto edge detection probe 13 so as to render the auto edge detection probe 13 operational. When the auto edge detection probe 13 detects an edge, it signals the measure means 5. The measure means 5 then sends an interrupt to the CPU 1 of the controller 10. This interrupt from the measure means 5, in essence, informs the CPU 1 of the controller 10 that point location data is available for transmission into the CPU 1. Since the measure means 5, via the linear encoders knows the position of the point location at all times, the auto edge detection probe 13 provides a means by which to signify that the data is point location data. The point location data is then read from the memory means 5 by the CPU 1 and stored as point location data in the CPU 1. Again, this data is serial in nature and the CPU 1 will process the data and obtain the X and Y coordinate components for the point location. In this manner, the auto edge detection mode of FIG. 4 allows for the automatic detection and entry of data for point locations.

In a third embodiment of the present invention which is illustrated in FIG. 5 (Embodiment #3), a video edge detection probe is utilized so as to provide an auto video edge detection mode. In the embodiment of FIG. 5, a video edge detection probing means 14 is utilized in conjunction with the data entry means 6. Further, the inspection device 4, the measure means 5, the data point input means 12, the video edge detection probing means 14, and the CPU 1 of controller 10 are connected in the following manner. The inspection device 4 is connected to the video edge detection probing means 14 which has associated therewith a frame grabber (not shown). The CPU 1 of controller 10 is connected to the video edge detection probing means 14 so that the CPU 1 and the video edge detection probing means 14 may communicate initialization and synchronization signals between the two. The data point input means 12 is connected to the CPU 1 so as to provide a means for manual data entry as is always the case in the present invention even if data entry may be made automatically. Further, the measuring means 5 is connected to the inspection device 4 wherefrom it receives linear encoder information pertaining to point location data.

The measuring means 5 is also connected to the CPU 1 so that the CPU 1 may interrogate the memory means 5 and read position location data therefrom. The memory means 5 also has an interrupt line which connects it to the CPU 1 so as to provide an interrupt to the CPU 1 upon the occurrence of an event, which is the location by the video edge detection probing means 14 of a point location.

In the embodiment of FIG. 5, the stage 30 is driven manually in a manual mode or automatically in a computer controlled mode, so as to obtain a field of view from which data is to be taken. Once a field of view has been obtained, the user or operator then activates the CPU 1 by any one of a number of possible actuation devices described earlier. In an automatic mode, the user or operator need not perform such actuation. Upon actuation, the CPU 1 activates and interrogates the video frame grabber (not shown) which is a component of the video edge detection probing means 14 and which is used to capture a video picture, having a field of view, by a video camera. The data representative of the entire field of view is input into the CPU 1 via the video edge detection probing means 14.

The measuring means 5 has the data which represents the center of the field of view at all times. The CPU 1 interrogates the measure means 5 so as to obtain the data representing the center of the field of view. The CPU 1 upon obtaining the data of the center of the field of view from the measuring means 5 then processes the field of view data in conjunction with the data obtained from the measure means 5 in order to determine the point location of the edge or feature of the object inspected in the following manner.

The edge of the object is determined by processing the field of view data with a sub-pixeling algorithm which locates an edge on the object which is being inspected. From this algorithm, dimensioning information can be provided in the field of view so that the edge point location data can be processed along with the data obtained from the measure means 5 to provide point location data. The CPU 1 then provides signals to the video edge detection probing means 14 which are, in turn, sent back to the inspection device 4. These signals from the CPU 1 are used to update the display of the field of view so as to determine the location of the point location chosen. A feedback algorithm may be employed which actually shows the video probe scan across the field of view and the point location is marked for the user or operator so as to update the image on the display monitor 300 of the inspection device 4. Throughout this operation, the frame grabber appears to be running in a real time mode so that, to the untrained eye, the visual aspects of this mode suggest that the video frame is constantly being updated and the picture of the object is always changing. The CPU 1 will then calculate the X and Y coordinate components for the point location and store this data for future use.

The above described three embodiments of the present invention facilitate the inputting of point location data into the CPU 1 of controller 10 so that said data may be utilized for subsequent system processing and operation. The CPU 1 will calculate the X and Y coordinate components from this data and store this data for future use in the determination of the feature type which was inspected and/or measured. It will be shown below, that once data has been entered for one point location, the probing data entry routines may be repeated for any desired number of point locations. The number of point locations entered may be determined by the user or operator who may activate a device such as a footswitch or any other suitable means connected to the interactive user interface 7 upon completion, or be preselected by the user or operator prior to entering the measurement routine.

The CPU 1 of the controller 10 is software controlled. The algorithms utilized, which will be described in greater detail below in a description of system operation, enables the apparatus of the present invention to determine the shape of the feature type of the object, or portion thereof, which has been inspected and/or measured and for which point location data has been obtained.

While the three embodiments which have been set forth above describe various embodiments for the apparatus and methods for point location and data entry into the CPU 1 of controller 10, it should be noted that other probing or point location devices and methods and other data entry devices and methods may be employed to input point location data into the CPU 1 during system operation.

Figure 6:
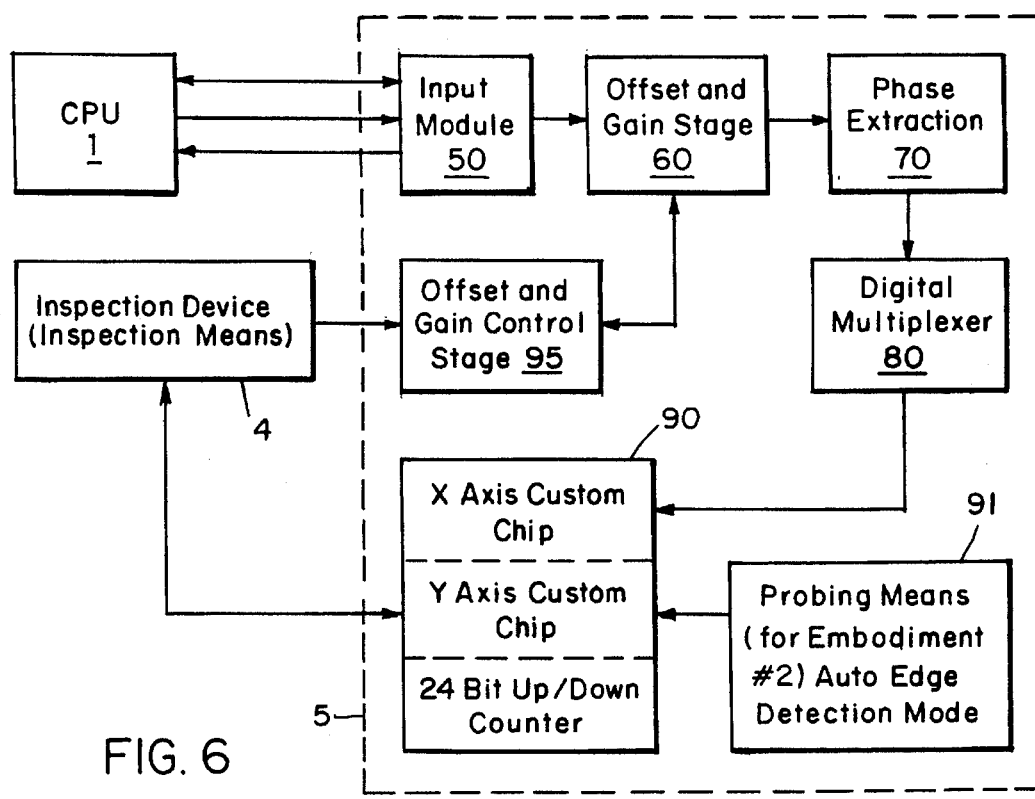
FIG. 6 illustrates, in block diagram form, a typical measure means device which is utilized in the present invention.
Figure 7:
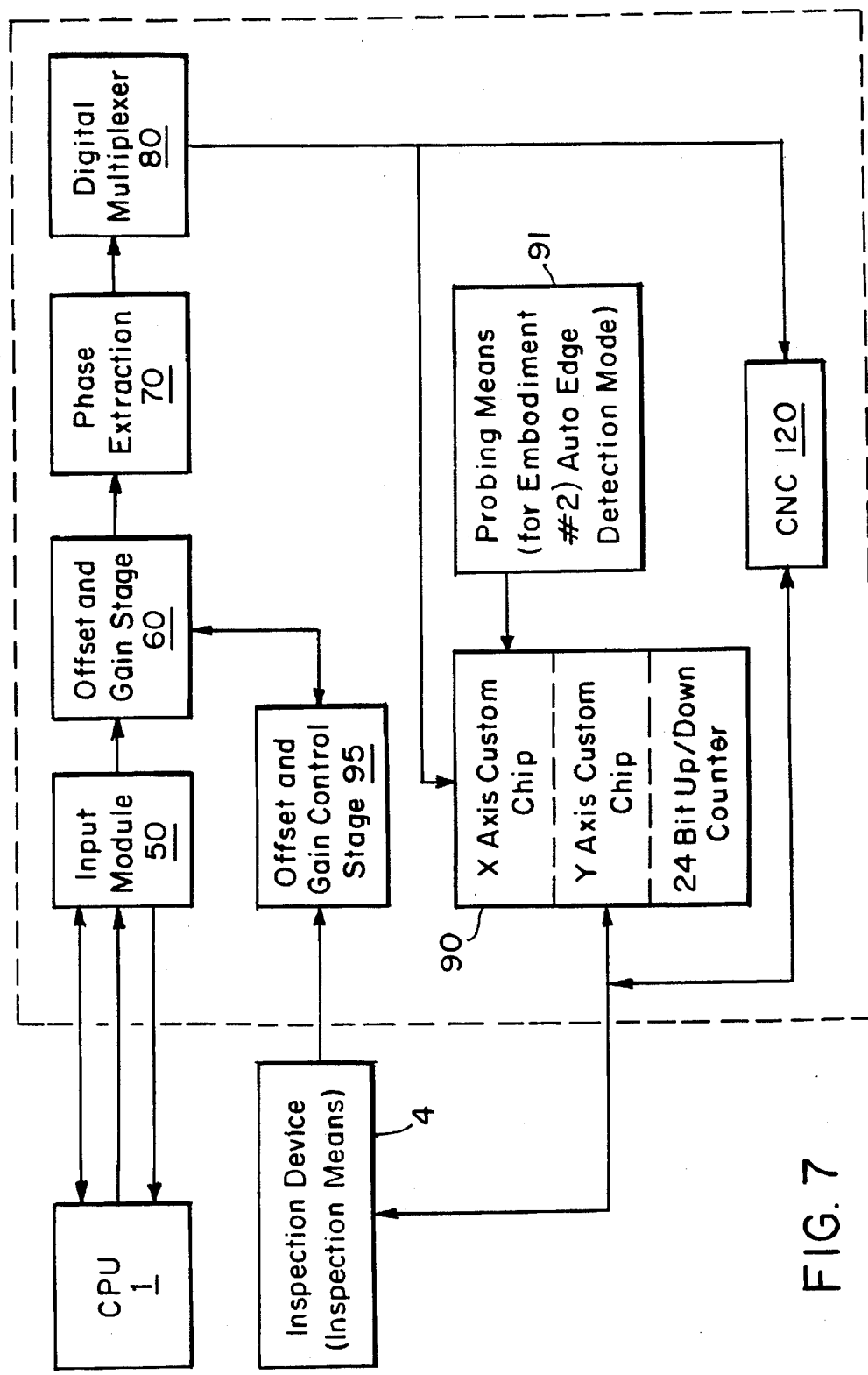
FIG. 7 illustrates, in block diagram form, a typical measure means device which is utilized in the present invention and which further comprises a computer numerical control device for providing computer control over the taking and retaking of point location data during system operation.

The measure means 5 utilized in the present invention will be described in more detail with reference to FIGS. 6 and 7. FIG. 6 illustrates a block diagram of the measure means 5, while FIG. 7 illustrates a block diagram of the measure means 5 with the addition of a Computer Numerical Control (CNC) means or device which may be provided to enhance the operation of the object measuring system as will be described in more detail below.

The measure means 5 utilized in the present invention provides many design benefits over more standard designs. Different stages or viewing devices may have different scales for measuring the movement of the stage 30 or the viewing device 34. Further, each scale manufacturer may have its own amplitude and offset ranges for its scales or for the measuring devices such as the linear encoders relating thereto. The measure means 5 provides a means by which to effect a simplified change of amplitude and offset for a wide variety of scales. Therefore, the present invention may be adaptable for operation with a great number of measuring devices.

As described with reference to FIGS. 2, 4 and 5 above, the measure means 5 receives data from the inspection device 4, which represents point location data. The signals provided from the inspection device 4 are linear encoder data as described hereinbefore. The linear encoder signals are quadrature (digital) in nature and provide point location data to the measure means 5. It should be noted that in addition to being able to process quadrature signals which are digital in nature, it is also possible for the measure means 5 to process analog signals which provides greater resolution in the determination of point location data than do the digital signals. The signal obtained from the inspection means 4 is input into the measure means 5 and, in particular, is input into an Input Module 50 which is a preamplifier and which is used to convert a current signal into a voltage signal. This function is bypassed when the input signal is a voltage signal. The voltage signal then passes from the Input Module 50 to the Offset and Gain Stage Module 60.

In the Offset and Gain Stage Module 60, the signals which may either be quadrature (digital) or analog in nature are unconditioned in that they are of an unknown origin in their size and shape. The Offset and Gain Stage Module 60 sends these unconditioned signals to the Offset and Gain Control Stage Module 95 which is connected to and receives data from the CPU 1 of the controller 10. The Offset and Gain Control Stage Module 95 interrogates these signals and makes corrections to the Offset and Gain Stage Module 60 so as to put these signals into a proper format for processing by the CPU 1 of controller 10. The conditioned or formatted signals are then sent to the Phase Extraction Module 70 which divides these signals so as to achieve a higher resolution of the linear encoder information.

The Digital Multiplier Module 80 then takes the quadrature (digital) signals or the analog sine wave signals generated by the Phase Extraction Module 70 and multiplies them so as to obtain a pulse train signal having a greater signal rate than the quadrature signal. As the signal exits the Digital Multiplier Module 80 it is still quadrature (digital) in nature. The signal is then sent to a Position/Counter Module 90. The Position/Counter Module 90 comprises a 24-bit up/down counter and processing chips which can be utilized to handle the X coordinate location data and the Y coordinate location data for point location which is inherent in the quadrature (digital) signal. Separate hardware chips may be provided to handle the X coordinate location data and the Y coordinate location data.

The Position/Counter Module 90 constantly monitors the signals input into the measuring means 5 and processes them as described above so that the signals are always in a proper form for processing by the CPU 1. The CPU 1 of the controller 10, interrogates the measure means 5 to determine the point location data.

The Position/Counter Module 90 basically takes these signals from the Digital Multiplier Module 80 and determines the point location data. The Position/Counter Module 90 has an input from the CPU 1 of the controller 10 which may be used to reset the Position/Counter Module 90. The Position/Counter Module 90 may also have an edge detection input from a probing means 91 such as the auto edge detection probe 13 of embodiment #2. When the object measurement system of the present invention is utilized in the auto edge detection mode of embodiment #2 as illustrated in FIG. 4, the auto edge detection probe 13 provides a data input to the measure means 5 and specifically to an edge detection input of the Position/Counter Module 90.

Upon the occurrence of an edge detection in the auto edge detection mode of embodiment #2, the auto edge detection probe 13 which is probing means 91 in FIG. 6, inputs a signal to the Position/Counter Module 90 which, in turn, will interrupt the CPU 1 of controller 10 so as to notify the CPU 1 that point location data has been collected for this event or occurrence which is the detection of an edge. The CPU 1 of controller 10 will then read this data from the measure means 5 and specifically from the Position/Counter Module 90 utilized therein.

In the manual data entry mode or the cross hair mode of embodiment #1, illustrated in FIG. 2, the measure means 5 is employed in order to obtain position location data for the X and Y coordinates from the inspection device 4. This X coordinate location data and Y coordinate location data is processed in the measure means 5 and read from the memory means 5 by the CPU 1 of controller 10. The CPU 1 of controller 10 will perform the processing schemes on the data obtained from the measure means 5, so as to obtain the X and Y coordinate component data therefrom. Since no auto edge detection probe 13 is utilized in embodiment #1 of FIG. 2, no edge detection input signal is provided to the Position/Counter Module 90.

In embodiment #2 which is the auto edge detection mode as illustrated in FIG. 4, a signal is provided from probing means 91, namely, the auto edge detection probe 13 of FIG. 4, which is activated by the inspection device 4 (not shown) and provided to the Position/Counter Module 90. This signal represents the detection of an edge. When this edge detection signal is input into the Position/Counter Module 90 of the measuring means 5, the counter in the Position/Counter Module 90 will become synchronized so that the exact time of the edge detection is known. This time information can be utilized in determining the point location data for the point location of interest and this data can be utilized by the system.

In embodiment #3 which is the video edge detection mode as illustrated in FIG. 5, measure means 5 operates in the same fashion as the measure means 5 which is utilized in embodiment #1 (manual data entry mode as illustrated in FIG. 2). In embodiment #3, the measure means 5 constantly monitors the point location data in the same way in which it does so in embodiment #1. Edge detection data is provided to the Position/Counter Module 90 from a video edge detection probing means 14 as was the case in embodiment #2 for the auto edge detection mode. In embodiment #3, however, the CPU 1 of the controller 10 interrogates the measure means 5 upon receiving a signal from the video edge detection probing means 14. In this manner, it is not necessary to input an edge detection signal into the Position/Counter Module 90 from a probing means 91 in embodiment #3 as was the case in embodiment #2.

FIG. 7 illustrates a measure means 5 which further comprises a computer numerical control device (CNC) 120 which is an optional feature in the embodiment of the present invention and which provides automatic control over object inspection including point location probing and data entry. While illustrated as a component of the measure means 5, the CNC device 120 may also be a device external to the measure means 5. Further the CNC device 120, like any other piece of hardware in the system, may be built into the CPU 1 of the controller 10. As was noted above, the object is inspected by manually or automatically moving a stage 30 which has the object placed thereon. A moveable viewing device 34 may also be utilized instead of a moveable stage. However, in a computer numerical control embodiment, wherein a CNC device 120 is added to the measure means 5, the stage 30 or the viewing device 34 can be moved automatically under system control once point location data has been entered into the system. In the CNC mode, the CNC 120 will store point location data which was entered either manually or automatically into the system. The CNC will then utilize these sorted point locations to "play back" the measurement routine. Similarly, if a stationary stage 30 is employed with a moving viewing device 34, the viewing device could be controllably moveable by the CNC 120 as well.

In FIG. 7, the CNC device, denoted by the reference numeral 120 is connected to the Digital Multiplier Module 80 and receives the data therefrom along with the Position/Counter Module 90. The CNC device 120 is also connected to the CPU 1 of controller 10. The CNC device is actually a processor all by itself. The CNC device 120, by reading and storing X and Y point location data from the Digital Multiplier Module 80, can utilize this data to generate a closed loop control of the stage 30 or viewing device 34 of the inspection device 4. The CNC 120 keeps in memory the data representing point location which are to be probed and measured by any of the three previously described embodiments of probing means, i.e. manual data entry mode, auto edge detection mode, or the video edge detection mode, or by any other probing means employed. The CPU 1 may then instruct the CNC device 120 to send control signals to the inspection device 4 which causes the stage 30 or the viewing device 34 to move in such a way as to locate one of the point locations stored in memory, utilizing the point location data from the Digital Multiplier Module 80 to locate the point along both the X and Y linear axes of the stage 30 or the viewing device 34. Once the CNC 120 has located the desired point, a point location measurement may be taken. In effect, the CNC device 120 provides a memory feedback mechanism.

In addition to inputting data via one of the probing means into the measure means 5 and into the CNC device 120, it is also possible to manually position the stage 30 or the viewing device 34 so as to locate a point via a user pointing device 8 such as by a joystick, a trackball, or a mouse. These point locations can also be stored in the CNC device 120, for later use, by means of activating a user switch. Once all of the point locations have been entered, they can be "played back" via the CNC device 120 in the CNC mode as is described above.

The CNC mode also has the capability of repeating measurements based upon the point location data which has been stored previously even if the direction of the object's orientation has been changed. In this manner, if point location data has been stored and the object is then oriented in a different direction, the system and the CNC 120 will "skew" or modify the axis system measurement upon the entry of at least data from two point locations. Thereafter, the CNC device 120 will direct movement of the stage 30 or the viewing device 34, whichever is moveable, along the prestored point locations for the object. In addition to "skewing" the data, the system and the CNC device 120 can work in conjunction with one another to provide the "unskewing" of point location data so as to take an object oriented in any direction and convert the coordinate data obtained therefrom into machine coordinates which may then be utilized to measure an object oriented in any direction.

Up to this point, the description of the apparatus and method of the present invention has been concerned with the various methods for probing and entering data representative of point location and the entry of this data into a storage means or device in the CPU 1 of controller 10. A description of the overall operation of the object measurement system including how the point location data is processed will be set forth in detail below and with reference to the flow diagrams in FIGS. 8, 9 and 10A to 10E.

The operational software utilized in the apparatus and method of the present invention comprises a main program for controlling the overall operation of the object measuring system as well as two subroutines which allow vital interfacing between the user or operator and the system. One of these subroutines provides a means by which the user or operator may "set-up" the object measurement system in terms of prespecifying operating error criteria and tolerances. The second subroutine is utilized to allow the user or operator to disregard the type of feature which was generated by the object measurement system if said type or feature is inconsistent with the expected results. In effect, the user or operator may override the type of feature generated by the system and direct the generation of a desired feature type.

Figure 8:
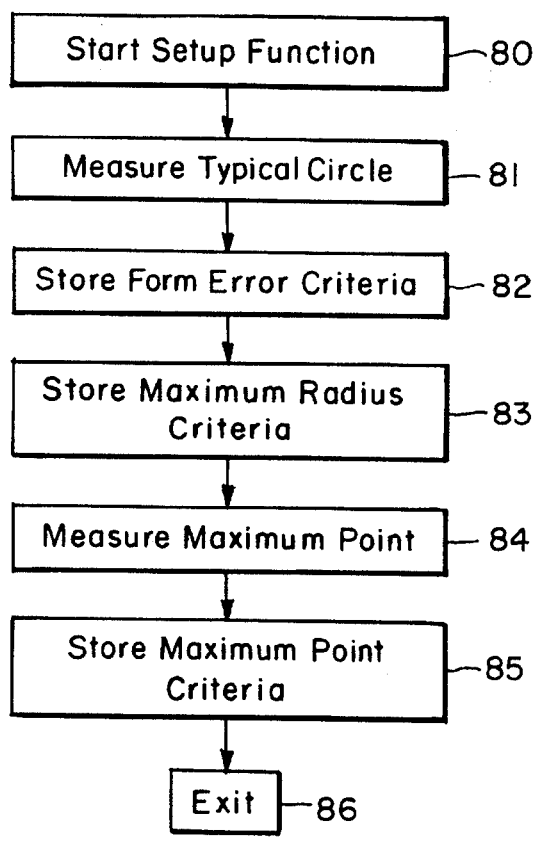
FIG. 8 illustrates, in flow diagram form, the method utilized in a set-up function subroutine in the present invention for performing user or operator set-up or preselection of the acceptable error limits and/or error criteria which are to be utilized in system operation.
Figure 9:
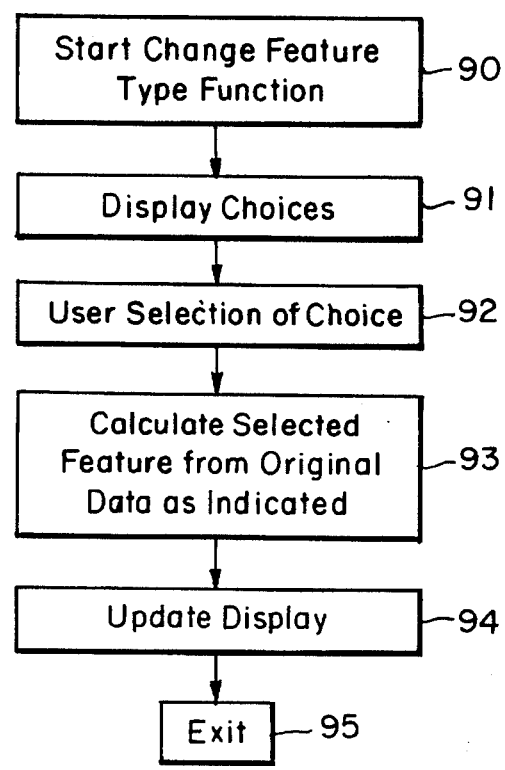
FIG. 9 illustrates, in flow diagram form, the method utilized in a change type of feature function subroutine in the present invention for performing a user or operator override of the type of feature generated by the present invention should this type of feature be inconsistent with expected results.

The set-up subroutine is set forth in flow diagram form in FIG. 8 while the user/operator override subroutine is in set forth in flow diagram form in FIG. 9. Each of these subroutines will be described in more detail in the description of overall system operation as they may be invoked during such system operation. The main operational program which directs operation of the object measuring system from start to finish is set forth in flow diagram form in FIGS. 10A to 10E.

Figure 10A:
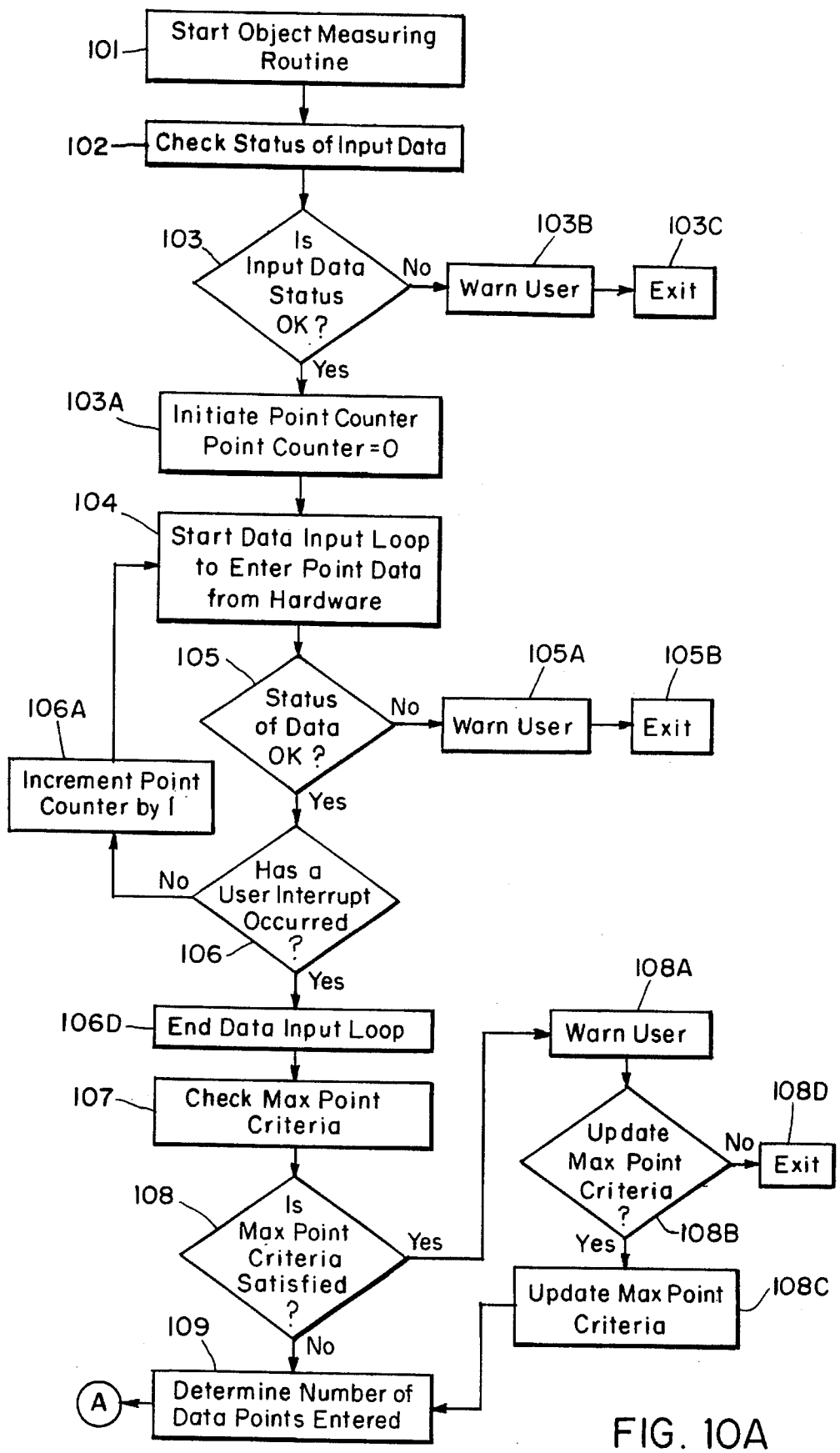
FIGS. 10A–10E illustrate, in flow diagram form, the method utilized in the present invention for performing the overall system operation for the object measurement system.

Referring to FIG. 10A, the operation of the object measurement system of the present invention is activated at functional step 101. Such system activation may be performed by selecting a menu item listed or displayed on the interactive user interface display monitor 450. Such selection may be made via an interactive user interface keyboard 460 or some other activating means associated with the interactive user interface 7. Further, selection may also be made via the user pointing device 8. As was described above, user interaction with the system of the present invention may be by any one of a multitude of possible means. The only requirement that must be met is that the action of the user or operator be effectively transmitted to the system CPU 1 of the controller 10 so as to affect system operations.

Upon system activation, the system may be completely reset which means that the system structures are cleared of any prior or residual data. These system structures include the hardware and software devices and memory structures as well as the probing and data entry means. By system design, a status check is performed on the signals which are generated by the linear encoders at functional step 102. This status check encompasses verifying that the linear encoder signals which may be either quadrature (digital) or analog signals generated in the inspection device are in proper form and format so that the data inherent therein is valid and non-erroneous. Such a status check or verification may be performed by the CPU 1 or any other system component and by any one of a number of methods known in the art of signal verification.

This status check performed on the signals generated by the inspection device 4 is repeated each time a point location measurement has been entered into the system. This practice ensures that the data input will be error-free. It may also be possible for the system to perform status checks on the hardware utilized in the system of the present invention. This may also be performed by any one of many widely known system self-test methods wherein the system program may run through a self-test routine to detect malfunctioning hardware.

The results obtained from the status check on the data which is generated by the inspection device 4 will then be tested at functional step 103 in order to determine if such data is error-free and acceptable. If the status check results in the determination that the data is error-free the object measuring system will initiate a point location counter at functional step 103A and the system will then enter a data input looping routine which will enable either the user or operator or the object measurement system to enter point location data for any number of point locations. These point locations may be detected and entered by any one of the probing and data entry embodiments described in FIGS. 2, 4 or 5.

If the input data status check at functional step 103 determines that a problem exists in the input data or the input data generating device, which preferably are the linear encoders, then the object measurement system will indicate this error status to the user or operator by an appropriate display and/or message on the interactive user interface display monitor 450 and/or by issuing an audio warning signal to the user or operator via the audio feedback means 9. The system may also indicate any specific hardware status problems which may be encountered in a system hardware self-test routine and indicate the results of such test to the user or operator by any one of the above-described methods or means.

The audio signal chosen to indicate an error or problem status or a system malfunction may be an unpleasant or "sad" sound, tone, or melody which is predetermined or pre-specified to be indicative of such a faulty condition in the system. A fault free data condition or a fault free hardware condition may also be indicated to the user or operator by display messages on the display monitor 450 and by issuing a pleasant "happy" sound, tone, or melody from the audio feedback means 9. Upon system display and/or issuance of these warning messages, the object measurement system will exit the routine at functional step 103C in order to allow appropriate action to be taken by the user or operator. The user or operator can also acknowledge the occurrence of these warning messages by means of the interactive user keyboard 460 or by any one of a number of actuation devices which can be utilized with the system or by the user pointing device 8.

Once the system input data is found to be error-free and acceptable the object measurement system will begin a data input loop at functional step 104. At function step 104, point location data will be entered into the CPU 1 of the controller 10 by any one of the probing and data entry means described in the embodiments of FIGS. 2, 4 and 5.

Once the point location data has been entered into the CPU 1, the system again performs, at functional step 105, a status check on the point location data so as to determine if this data is faulty. If the data is found to be faulty, the system will issue a warning to the user or operator at functional step 105A in the same manner described above for functional step 103B, that is, for example, via a display message on the display monitor 450 and the issuance of an unpleasant audio sound, tone or melody from the audio feedback means 9 at functional step 105A. It should be noted that in functional steps 103 and 105, desirable results indicative of error free data or properly functioning hardware may also be indicated to the user or operator on the display monitor 450 and/or by the audio feedback means 9. In this case, the audio feedback means may issue a pleasant sound, tone or melody.

In a case when a data error condition exists, the system, after warning the user at functional step 105A, will exit the operational program routine at functional step 105B. It should be noted that the user may also acknowledge the warning messages or signals pertaining to an erroneous data condition via actuation means on the interactive user interface 7 or by the user pointing device 8.

If the data is found to be error-free at functional step 105, a test is performed to determine, at functional step 106, whether the user or operator has interrupted the system operation. Such an interruption may occur when the user or operator has taken all of the point location data that is desired to be taken. This interrupt may be generated by the user's or operator's actuation of an actuation means which may be any actuation device such as a footswitch on or associated with the interactive user interface 7 or by the user pointing device 8 or by any other suitable means.

This interrupt originates in hardware and may be utilized to interrupt the operational software of the system. This may be accomplished by any of the widely known conventional methods for interrupting a software system's operation. The system may also be designed to take a predetermined amount of point location data in which case, the interrupt means utilized at functional step 106, may be replaced by an alternate device which monitors point location data entry and issues an interrupt after a predetermined number at point locations have been entered. If the user or operator has not interrupted the system operation, the data input loop will allow the entry of data for another point location. In this case, the point counter will be incremented by one at functional step 106A and the system will return to functional step 104 and the above described sequence of events will be repeated for the entry of data from the next point location.

If an interrupt has occurred indicating the end of point location data entry, the system exits the data input loop at functional step 106D. At this point, the number of data point locations which have been entered as well as the data for each of these point locations is stored in system memory which may be the RAM 2 or any other suitable memory storage device.

Once all of the point location data has been entered, the system proceeds to functional step 107 at which point a system check is performed so as to ascertain whether or not the point location data for each entered point is within a pre-specified measurement envelope.

The pre-specified form error limits and measurement envelope may be defined or entered by the user or operator in the Set-Up Function Subroutine which is illustrated in flow diagram form in FIG. 8 and is described in the following manner.

The user or operator can select the Set-Up Function Subroutine at any time except during the operation of the program or subroutine which is described in FIGS. 10A–10E or in FIG. 8, respectively. Such selection may be made from a menu choice displayed on the display monitor 450 which may be selected by an activation means on or associated with the interactive user interface 7 or by the user pointing device 8. The Set-Up Function Subroutine begins operation at functional step 80 in FIG. 8. At functional step 81, the user or operator measures a circle which is typical of the object that is currently being measured. From the results of these measurements two criteria must be calculated. The first of these is the form error criteria which defines the error limits in the data set which are acceptable in comparison with the calculated circle.

In essence, a form error results in the following manner. If you take any given feature, such as the circle measured, and calculate a circle that best fits the point location data obtained, errors will result from the fact that objects in the real world are not perfectly symmetrical and, as a result, the data points will not lie exactly on the circumference of the circle. The form error criteria referred to above consists of inspecting all of the data points and determining the cases of worst error, that is, those points that lie furthest from, and closest to, the center of the circle. Thereafter, the distance of these points from the circumference generated is calculated. By determining point distances for the inner and outer worst points, a form error criteria is calculated and stored at functional step 82.

This form error criteria is an error limit which is then utilized to calculate the maximum circle radius which can be measured by the system. The maximum circle radius is determined by multiplying the radius calculated for the circle by a predetermined constant value stored in system software. This constant value may be modified by service personnel if such a modification is desired or warranted. The maximum radius criteria, which could be used in circle or arc calculations, is then stored at functional step 83. Once the form error criteria and the maximum radius criteria have been stored, the user or operator must measure, at functional step 84, a maximum point to define a maximum measurement envelope. This point is defined as the extreme or maximum location on the stage 30 which is reachable by the viewing device 34 of the inspection device 4. This maximum point is utilized to compare point location data, which is taken during system operation, so as to ensure that the point location data is taken from within the stage 30. In this manner, it is ensured that the point location will not lie on a point which is off of the stage 30. Upon storage of this maximum envelope or maximum point criteria at functional step 85, the system exits from the Set-Up Function Subroutine at functional step 86.

Referring once again to FIG. 10A and, in particular, to functional step 107, the position location data for each point is checked against the maximum envelope criteria obtained from the Set-Up Function Subroutine, or from an alternate manner to be described below. This point location data is checked at functional step 108. If the data for any point or points are out of the range set forth by the maximum envelope criteria, that is off the stage 30, the user or operator is warned, at functional step 108A, in a manner described above in functional step 103B. The user or operator is then provided with a choice as to whether to update the maximum envelope criteria so that it will coincide with the amount by which the worst case point is outside the measurement envelope. This selection may be performed at functional step 108B with said selection being made by the user or operator via the interactive user interface 7, the user pointing device 8 or via some other alternate devices. If the maximum envelope criteria is chosen to be updated, such update takes place at functional step 108C. Thereafter, all data will be compared against this updated maximum envelope criteria. If the maximum envelope criteria update is declined or refused by the user or operator, the system exits the operational program routine at functional step 108D.

If the maximum envelope criteria is not out of range, so that all point location data is within the maximum envelope of the stage 30, or if the maximum envelope criteria is updated, the system will proceed to functional step 109 in order to determine the number of data points entered. This point location count value was previously stored in the data input loop, in functional steps 104 to 106A as described above.

Figure 10B:
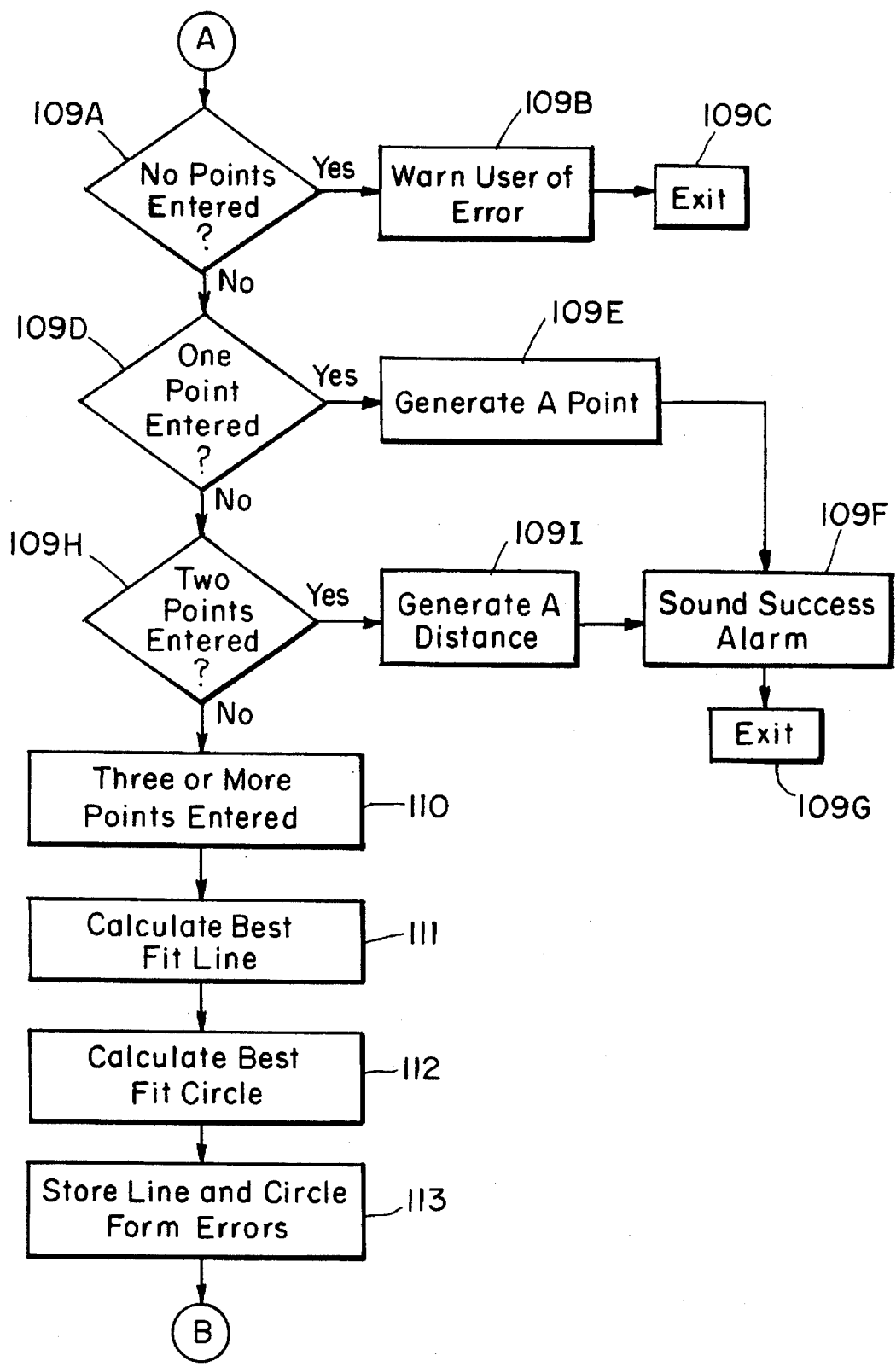

The system then proceeds to determine the number of data point locations entered in the following manner and with reference to FIG. 10B. At functional step 109A, a determination is made as to whether no point locations (zero point locations) have been entered. If no point locations have been entered, the system will, at functional step 109B, warn the user or operator of this error condition in the manner described above in functional step 103B. It should be noted that the nonentry of point location data will always be a system error condition as there will be no data to be processed by the system. The system will then exit the operational program at functional step 109C.

At functional step 109D, a determination is made as to whether one point location has been entered. If data for one point location has been entered, the system at functional step 109E and, as per system algorithm rule, will generate a point feature. This point feature will be displayed on the display monitor 450 of the interactive user interface 7. Also displayed on the display monitor 450, will be a readout of data providing both the X and Y coordinate components of the location of this point feature.

Upon point feature generation, a pleasant sound, tone or melody will be sounded by the audio feedback means 9 at functional step 109F. Thereafter, the system will exit the operational program at functional step 109G.

If, at functional step 109H, it is determined that two point locations have been entered, the system, at functional step 109I, as per system algorithm rule, will generate a distance measurement and this distance feature will be displayed on the display monitor 450 of the interactive user interface 7. Also displayed on the display monitor 450 will be a readout of the data for both the X and Y coordinate components of the location at this distance feature along with any other pertinent information relating thereto. Upon distance feature generation, a pleasant sound, tone, or melody will be issued by the audio feedback means 9 at functional step 109F. Thereafter, the system will exit the operational program at functional step 109G.

If, at functional step 110, it is determined that three or more point locations have been entered, the system will, at functional step 111, calculate a best fit line, which is a line which best fits through all of the point locations. Thereafter, the system will calculate, at functional step 112, a best fit circle, which is a circle which best fits through all of the point locations. The method of calculating the best fit line or the best fit circle can be any mathematical algorithm such as the least squares best fit method. The form errors, or form, for the best fit line and the best fit circle, which are the distances of the point locations from each of the line and circle generated, will then be stored in system memory at functional step 113.

Figure 10C:
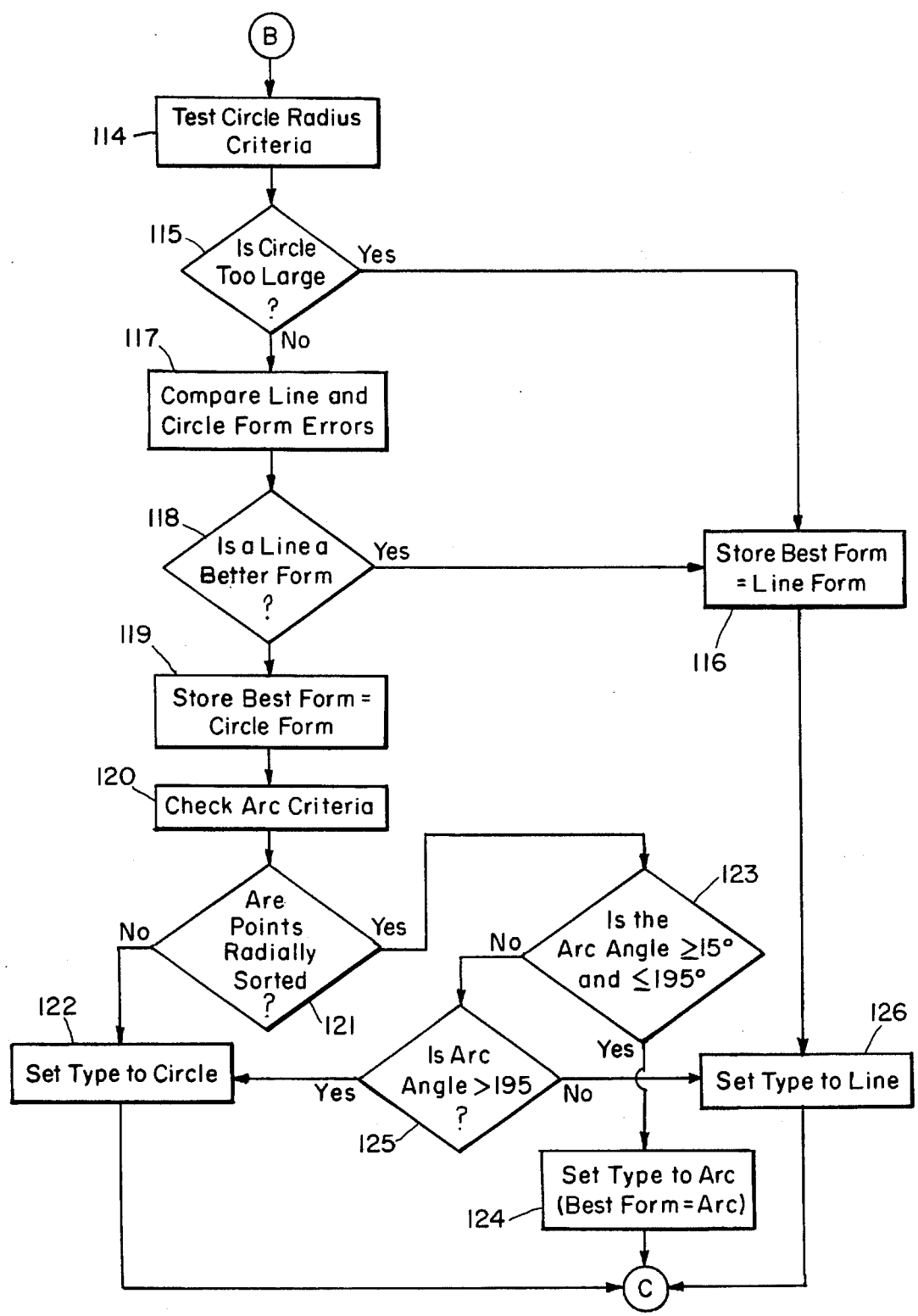

Referring now to FIG. 10C, in functional step 114, the radius of the best form circle is tested against the maximum radius which was obtained in the Set-Up Function Subroutine. If, at functional step 115, this best form circle radius is determined to be larger than the maximum radius criteria, the system will, at functional step 116, store the best form as a line. It should be noted that the "best form" referred to above, is a variable which is utilized in order to store data indicative of a best form feature. The system will then set the feature type to a line at functional step 126. If the radius of the circle generated is not larger than the maximum radius criteria, then the system, at functional step 117, will compare the form errors for the line and for the circle. That is to say that the form errors for the point locations of the line are compared against the form errors for the point locations of the circle. If, at functional step 118, it is determined that the line has a better form, that is, the form errors for the point locations about the line are less than the form errors for the point locations about the circle, the system will store, at functional step 116, the best form as a line. The system will then set the feature type to a line at functional step 126. If it is determined, at functional step 116, that the line does not have a better form then the circle, the system, at functional step 119, will store the best form as a circle.

If the best form has been determined to be a circle, the system, at functional step 120, will check to determine if the point locations form an arc feature instead of a circle feature. The two criteria which are used to differentiate an arc feature from a circle feature are whether, at functional step 121, the points are radially sorted. By radially sorted, it is meant, that the points were taken at functional step 104, in an order around a circle. For example, if one were to imagine a circle having a center located at the origin of a cartesian coordinate system, if a first point location is taken at 45°, and a next point location is taken at 60°, and at 75° and so forth, such a measurement routine would constitute an increasing radial sort measurement.

In this manner, if each point location is taken in an order along the circumference of a circle and in a same positive or negative direction, as long as the point locations were taken in the same direction through the data entry procedure, this measurement scheme would serve as a first criteria for determining the existence of an arc feature. If the radial sort at functional step 121 fails, the feature type is determined to be a circle in functional step 122. If in fact the data points are radially sorted in functional step 121, a test is then performed, at functional step 123, to determine whether the total angle which has been cut by the arc, along its length, is greater than or equal to 15° and less than or equal to 195°. If the arc angle is greater than or equal to 15° or less than or equal to 195°, then the second criteria is met for an arc feature and the system, at functional step 124, determines the feature type to be an arc. In functional step 124, the best form is then also stored as an arc feature.

If the arc angle is not greater than or equal to 15° or less than or equal to 195°, then a test is performed, at functional step 125, to determine whether the arc angle is greater than 195°. If the arc angle is greater than 195°, the system will set the feature type to be a circle at functional step 122. If the arc angle is not greater than 195°, then the arc angle must be less than 15° and the system will set the feature type, at functional step 126, to be a line.

Figure 10D:
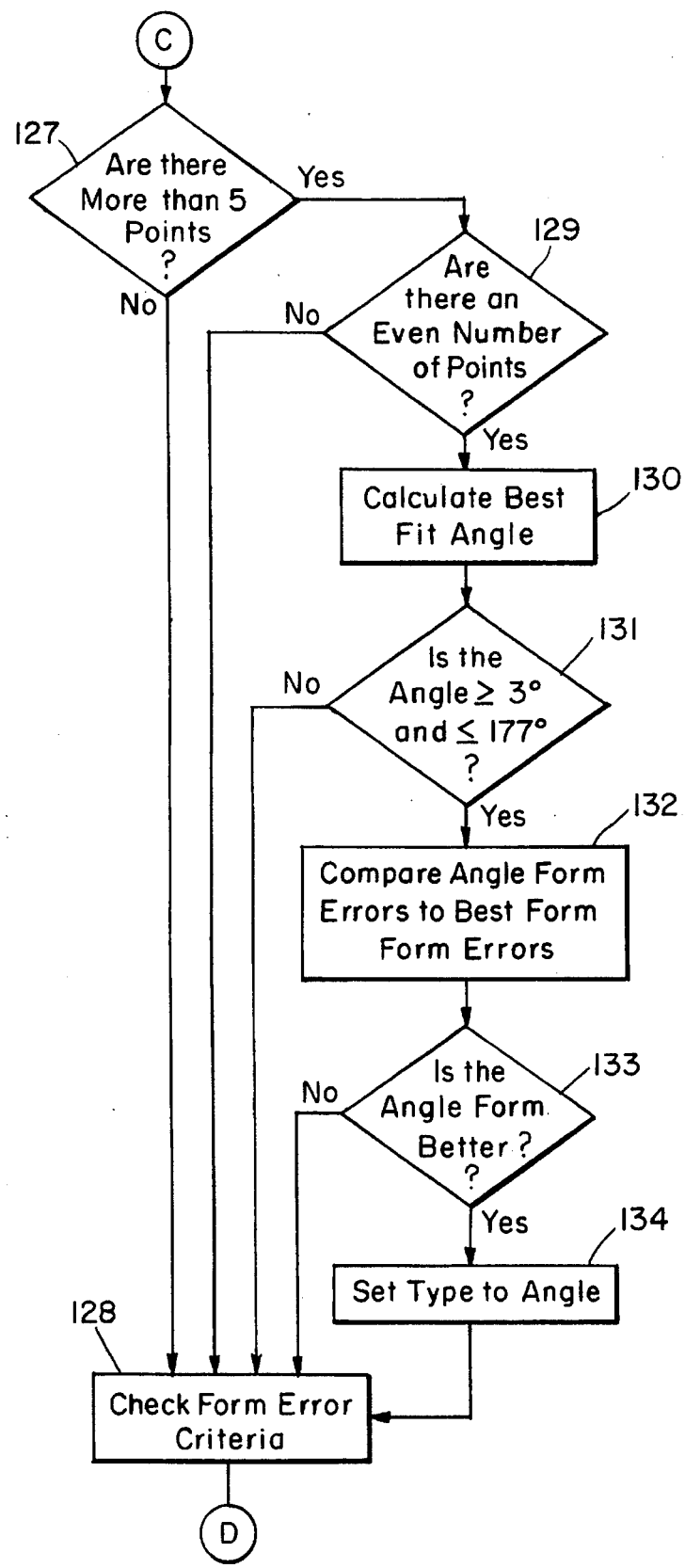

Once the system has determined the type of feature, whether such be classified as a circle, an arc or a line, a test must then be performed, at functional step 127, in FIG. 10D to determine if more than five point locations have been entered during the measurement procedure. In effect, this portion of the object measurement system operation seeks to determine whether or not an angle feature has been entered. If no more than five point locations have been entered, then an angle feature would not be possible as the algorithm rules require that each leg in an angle measurement must contain at least three point locations. Further, each leg of the angle measured must have an equal number of point locations.

If no more than five point locations have been entered, then the system proceeds to functional step 128 in order to check the form error criteria of the feature type. At this point, it should be noted that the system need not perform any further processing. This feature type previously stored in memory at functional step 122 (circle), at functional step 124 (arc) or at functional step 126 (line) is then determined to be the feature type resulting from the measurement. If however, more than five point locations have been entered, the system will proceed to functional step 129 in order to determine whether an even number of point locations i.e. 6, 8, 10 an so on, or whether an odd number of point locations, i.e. 7, 9, 11 and so on, have been entered. If an odd number of point locations have been entered, then there can be no possible angle feature as each leg of the angle feature would not contain the required equal number of point locations. If an odd number of point locations have been entered, the system will proceed to functional step 128 in order to check the form error criteria for the feature type previously stored by the system at either of functional steps 122, 124 or 126.

If an even number of point locations have been entered into the system, then the system proceeds to functional step 130 and calculates the best fit angle. The best fit angle is calculated by calculating two best fit line segments, one from the first half of the total number of point locations entered and the second from the second half of the total number of point locations entered. Hence, the line segments are generated from equal numbers of point locations. Once the line segments have been calculated, the angle between them at their point of intersection is calculated at functional step 130. In this manner, the angle feature is calculated.

Once the angle feature has been calculated, at functional step 130, a test is performed thereon, at functional step 131, to determine if the angle feature is close to 0° or 180°. In this manner, the system checks to determine if the angle feature is actually a straight line. Three (3°) degrees has been chosen to be the chosen criteria for making this determination. The criteria set forth in the algorithm for this test, therefore, is whether the angle is greater than or equal to 3° or less than or equal to 177°. If the angle feature is found to be less than 3° or greater than 177°, the system will then proceed to functional step 128 to check the form error criteria for the current best fit feature.

If however, the angle feature is found to be within the tested range, that is, greater than or equal to 3° and less than or equal to 177°, then the form errors for the angle feature, which are the sum of the form errors for the two line feature segments are compared, at functional step 132, to the form errors for the feature stored in the best form variable or as the best form which was previously stored in either of functional step 116 (line), functional step 119 (circle) or functional step 124 (arc).

If, at functional step 133, the angle feature form errors are determined to be less than those of the form errors for the previously stored best form, then the system will set the feature type to be an angle feature at functional step 134. The system will then proceed to functional step 128 to check the form error criteria. If the angle feature form errors, at functional step 133, are not found to be less than the form errors for the stored best form feature, then the stored best form feature type will be maintained and the system will proceed to functional step 128 to check the form error criteria.

In functional step 128, the system performs a form error criteria check for the feature type to determine if it falls within the form error limits which were either entered by the user or operator during the Set-Up Function Subroutine or subsequently updated during system operation such as in functional step 108C described above or in functional step 143 which will be described below.

Figure 10E:
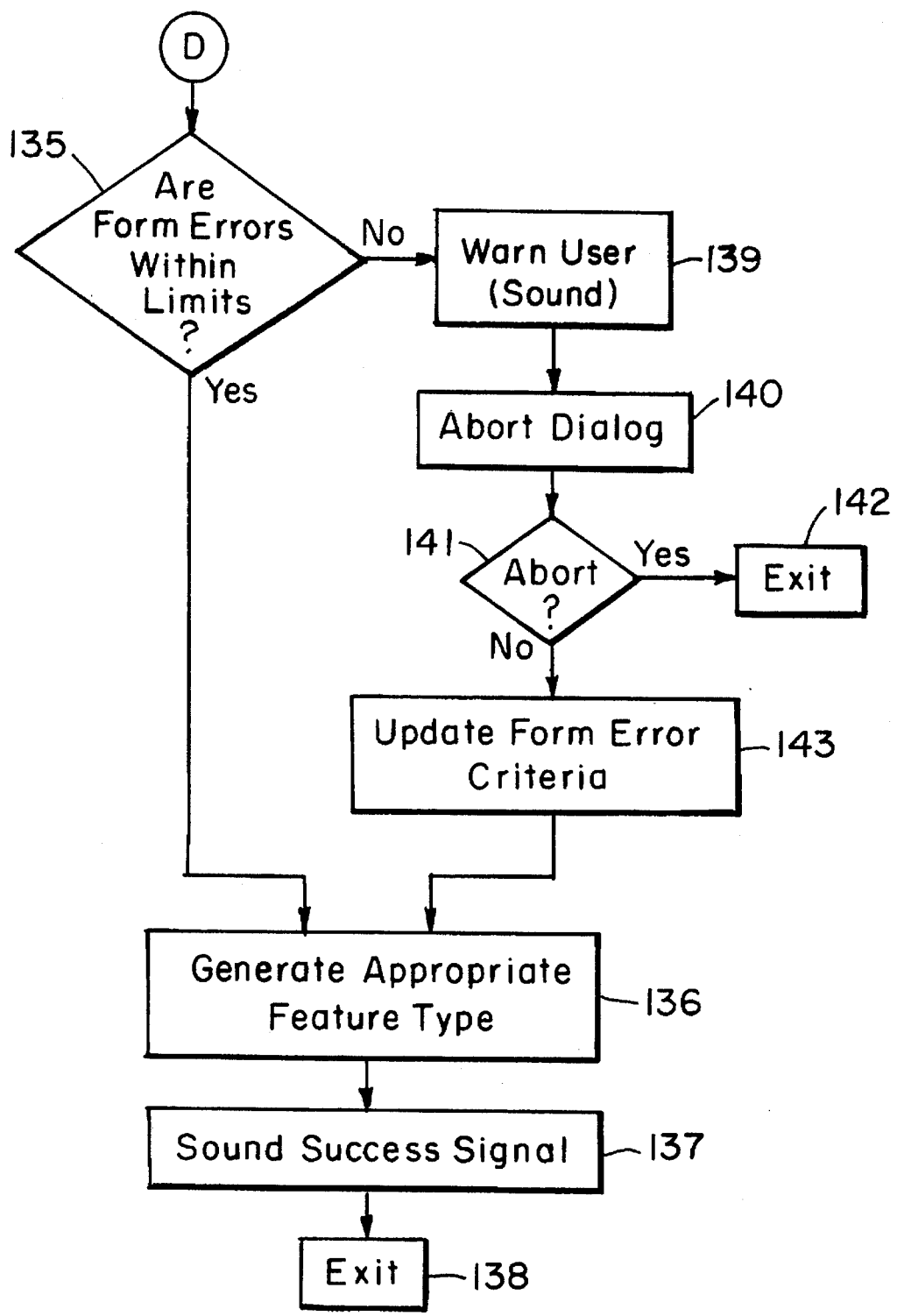

In functional step 135 of FIG. 10E, a test is performed by the system to determine if the form errors for the given feature type are within the pre-specified form error limits or form error criteria. If the form errors for the feature type are within the pre-specified limits, the system, at functional step 136, will generate the appropriate feature type and output a display of such on the display monitor 450 of the interactive user interface 7 along with any other relevant data or measurement information relating thereto. The system will then sound a pleasant sound, tone or melody from the audio feedback means 9, at functional step 137, and the system will thereafter exit the operational program at functional step 138.

It should be noted that at functional step 136, once the feature type is generated and displayed, the user or operator may invoke, via an actuation means on or associated with the interactive user interface 7, or by the user pointing device 8, the operation of a Change Feature Type Function Subroutine. The generation of an undesired feature type may result from probing errors or inaccuracies or from the failure of the user or operator to follow the probing rules for the system. These probing rules, for example, include the rule described above for the radial sorting of arcs. The Change Feature Type Function Subroutine, in effect, allows the user or operator to disregard the feature type generated and displayed. The user or operator can, therefore, override the feature type determination made by the system.

The Change Feature Type Function Subroutine is illustrated in flow diagram form in FIG. 9. The subroutine is activated at functional step 90 by any one of the techniques described above for user or operator interfacing with the system. The subroutine will, at functional step 91, display the possible choices of feature types that the system can possibly generate. The user or operator, at functional step 92, may select the feature type which is desired to be generated by the system. The selection is also made by any one of the possible user or operator interface means or devices described above. The system as described herein, can generate feature types which include a point, a distance, a line, a circle, an arc or an angle.

Once the user selection of the feature type has been made at functional step 92, the system, at functional step 93, will calculate this feature type using the point location data which was entered into the system during the measurement routine. The system will then display this newly generated feature type along with the relevant data and measurement information relating thereto in a manner similar to that described for functional step 136 of the operational program. The system will then exit the Change Feature Type Function Subroutine at functional step 95.

If, at functional step 135, it is determined that the form errors of the feature type generated are not within the pre-specified form error limits or form error criteria, then the system will, at functional step 139, issue a warning to the user via the display monitor 450 of the interactive user interface 7 and by issuing an unpleasant sound, tone or melody from the audio feedback means 9. The system will then, at functional step 140, issue a message to the user or operator via interactive user interface 7 such as on the display monitor 450 which will inquire as to whether the user or operator wishes to abort the operation. The user or operator may make his selection of whether to abort the operation by any one of the possible user or operator interfacing devices or means described above.

A test is performed, at functional step 141, to determine if the user or operator has chosen to abort the operation. If the user or operator has chosen to abort the operation, the system will exit the operational program at functional step 142. In this case, the system will not generate and display the feature type. If, however, the user or operator does not wish to abort the operation, the feature type along with its associated form errors will be accepted by the system. At this point, the system will, at functional step 143, update the form error criteria so that they coincide with the form errors of and for the present feature type. In this manner, the form error criteria will be updated for this program operational cycle as well as for future program operation as long as they are not subsequently updated by the user or operator by performing a new Set-Up Function Subroutine or by a form error update during system operation, such as in functional step 143. The system will then proceed to functional step 136 whereupon the appropriate feature type will be generated and displayed along with the data and measurement information relating thereto, on the display monitor 450 of the interactive user interface 7. The system will then issue a pleasant sound, tone or melody, from the audio feedback means 9 to indicate a successful operation. Upon completion of the above operation, the system will then exit the operational program at functional step 138.

Upon completion of system operation as set forth above, the object measurement system may then be either manually reset and reactivated such as by a user or operator interface feature or it may be programmed to be reset and reactivated automatically so as to repeat object measurement system operation in an automatic fashion or mode. In this manner, user or operator actuation means may be provided in either hardware or software to allow the user or operator to select either a manual and/or an automatic operation mode.

While the apparatus and method of the present invention has been described as a two-dimensional object measurement system, it is important to note that the apparatus and method of the present invention may also be utilized in measuring or inspecting objects in a three-dimensional inspection scheme. Therefore, the present invention may be utilized in three dimensional measurement applications wherein point location data can be acquired and calculations performed thereon by utilizing the apparatus and methods described herein.

While three embodiments of the present invention have been described as alternate preferred embodiments, other alternative embodiments are envisioned which may include other point location probing and data entry means which may utilize motion control systems, laser probing devices and techniques, or any other suitable probing and/or data entry devices or techniques. Further, other methods for processing the point location data, or for performing overall system operation or subroutine functions, may also be utilized in the present invention.

While the preferred embodiments of the apparatus and method of the present invention have been described herein, such descriptions are meant to be merely illustrative of the present invention and are not to be construed to be limitations thereof. Therefore, the present invention may encompass any and all modifications and/or alternate embodiments the scope of which are limited only by the claims which follow.

What is claimed is:

1. An object inspection system comprising:

an inspection station for holding an object to be measured;

a display monitor for viewing the object to be measured;

means for inputting at least one point location datum indicative of a point on the object;

processing means, responsive to the inputted point location data, for automatically determining if the inputted point location data represent a particular geometric feature type including a single point, two single points, a line, a circle, an arc, and an angle; and means for displaying an indication of the geometric feature type determined to be represented by said inputted data.

2. The system of claim 1 in which said processing means further includes means for generating a single point if only one point location datum is entered and for determining the coordinates of said single point.

3. The system of claim 2 in which said means for displaying includes means for outputting the coordinates of a geometric feature determined to be a single point.

4. The system of claim 1 in which said processing means includes means for calculating the distance between two data points if only two data points are entered.

5. The system of claim 4 in which said means for displaying includes means for outputting the calculated distance between the two entered data points.

6. The system of claim 1 in which said processing means includes means for calculating, from the entered data points, whether the data points fit an equation for a line.

7. The system of claim 6 in which said processing means further includes means for calculating, from the entered data points, whether the data points fit an equation for a circle.

8. The system of claim 7 further including a stored maximum radius for a circle and means for determining if the data points entered define a circle with a radius greater than the stored maximum radius.

9. The system of claim 8 further including means for defining a line geometric form type if the entered data points form a circle with a radius greater than the stored maximum radius.

10. The system of claim 7 further including means for:

comparing the fit of the entered data points with an equation for a line and the fit of the entered data points with an equation for a circle, and storing an indication of the equation with the best fit.

11. The system of claim 1 further including means for determining whether the entered data points form a circle or form an arc.

12. The system of claim 11 in which said means for determining includes means for analyzing if the entered data points were entered in order sequentially along an arc and, if not, storing a circle geometric form type.

13. The system of claim 11 further including a routine for determining if the entered data points were entered in order sequentially an arc and, if so, storing an arc geometric form type.

14. The system of claim 13 further including means for calculating the arc angle defined by said entered data points.

15. The system of claim 14 further including means for defining an arc geometric form type if said arc angle is between 15° and 195° and for defining a circle geometric form type if said arc angle is greater than 195°.

16. The system of claim 1 further including means for determining if more than five data points have been entered.

17. The system of claim 16 further including means for determining if an odd number of data points have been entered and in response for eliminating an angle geometric form type from the possible geometric form types defined by said entered data points.

18. The system of claim 17 further including means for calculating: a first line segment from the first half of the total data points entered, a second line segment from the second half of the total data points entered, and the angle between said first and second line segments.

19. The system of claim 18 further including means for storing a range of angles and for determining if said calculated angle falls within said range.

20. The system of claim 19 further including means for outputting a line geometric form type if said angle does not fall within said range.

21. An inspection system comprising:

means for holding an object to be inspected;

means for inputting at least one data point indicative of a point on a feature of the object;

processing means, responsive to the inputted data points, for automatically determining if a feature is a particular geometric form type including a single point, two single points, a line, a circle, an arc, and an angle.

22. The system of claim 21 in which said processing means includes a counter for counting the number of data points entered and means for classifying possible geometric form types based on the number of data points entered as follows:

| Data Points | Possible Geometric Form Types |
| --- | --- |
| 1 | a single point only |
| 2 | two single points only |
| 3–5 | one of a line, circle and arc |
| 6,8,10,12 ... | one of an angle, line, circle, and arc |
| 7,9,11,13 ... | one of a line, circle, and arc. |

23. The system of claim 22 further including means for outputting the coordinates of the data point entered if the geometric form type is classified as a single point.

24. The system of claim 22 further including means for outputting the distance between two entered data points if the geometric form type is classified as two single points.

25. The system of claim 21 further including means for calculating the fit of the entered data points to an equation for a line, circle, and an arc and for storing said fit as a geometric form type error.

26. The system of claim 25 further including means for outputting the geometric form type with the smallest geometric form type error.

27. The system of claim 21 further including:

a stored maximum circle radius;

means for comparing the radius of a circle formed by the entered data points with the maximum circle radius criteria; and means for setting the geometric form type to be a line if the radius of the circle formed by the entered data points exceeds the stored maximum circle radius.

28. The system of claim 21 further including:

means for determining the order of entry of the entered data points; and mean for setting the geometric form type to be a circle if the data points are not sequentially entered in order along an arc.

29. The system of claim 28 further including;

means for storing a range of arc angles;

means for comparing the arc angle formed by the entered data points with the stored range of arc angles; and means for setting the geometric form type to be an arc if the arc angle formed by the entered data points falls within said stored range of arc angles.

30. The system of claim 21 further including:

means for storing a range of angles;

means for comparing the angle form by the entered data points with the stored range of angles; and means for setting the geometric form type to be an angle if the angle form by the entered data points falls within said stored range of angles.

* * * * *